(12) United States Patent
Inagaki et al.

(10) Patent No.: US 6,539,298 B2
(45) Date of Patent: Mar. 25, 2003

(54) DRIVING CONTROL DEVICE AND METHODS FOR VEHICLE

(75) Inventors: Shoji Inagaki, Numazu (JP);
Yoshikazu Hattori, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/080,667

(22) Filed: Feb. 25, 2002

(65) Prior Publication Data

US 2002/0147532 A1 Oct. 10, 2002

(30) Foreign Application Priority Data

Feb. 28, 2001 (JP) ......................................... 2001-054916

(51) Int. Cl.[7] ............................................. B60K 41/06
(52) U.S. Cl. .............................. 701/70; 701/53; 701/83; 701/84
(58) Field of Search ............................. 701/70, 83, 84, 701/82, 41, 87, 53; 477/34, 115, 107

(56) References Cited

U.S. PATENT DOCUMENTS 6,089,680 A * 7/2000 Yoshioka et al. ............ 303/146
6,292,734 B1 * 9/2001 Murakami et al. ............ 701/84

FOREIGN PATENT DOCUMENTS

| JP | 5-2940173 A | 11/1993 |
| JP | 62-211064 A | 8/1994 |
| JP | 9-309357 A | 12/1997 |
| JP | 10-000965 A | 1/1998 |
| JP | 11-500380 A | 1/1999 |
| JP | 2000-185658 A | 7/2000 |

* cited by examiner

*Primary Examiner*—William A. Cuchlinski, Jr.
*Assistant Examiner*—Marthe Y. Marc-Coleman
(74) *Attorney, Agent, or Firm*—Oliff & Berridge, PLC

(57) ABSTRACT

A driving control device and methods including controllers for independently controlling a steering angle, and braking and driving force of each wheel. The device includes detectors that detect driver input including a steering operation amount, a driving force operation amount, and a braking force operation amount. Moreover, the device includes calculators that calculate a vehicle target longitudinal and lateral force, and a vehicle target yaw moment based on the inputs by the driver, a target generating force of each wheel based on the detected amounts, and a target steering angle and target braking and driving torque of each wheel based on the target generating force of each wheel. Finally, a controller controls the device so that a steering angle and the braking and driving torque of each wheel are determined to be the target steering angle and the target braking and driving torque.

47 Claims, 11 Drawing Sheets

DRIVING CONTROL DEVICE AND METHODS FOR VEHICLE

INCORPORATION BY REFERENCE

The disclosure of Japanese Patent Application No.2001-054916 filed on Feb. 28, 2001, including the specification, drawings and abstract is incorporated herein by reference in its entirety.

BACKGROUND OF THE INVENTION

1. Field of Invention

This invention generally relates to a driving control device and methods for a vehicle. More particularly, the present invention pertains to a driving control device and methods for independently controlling a steering angle, and a braking and driving force of each wheel.

2. Description of Related Art

A Japanese Patent Application Laid-Open No.11-500380 discloses a known driving control device which controls a yaw moment of a vehicle by independently controlling a braking force of each wheel depending on a vehicle model and a tire model. According to this driving control device, the vehicle will travel more stably compared to a vehicle in which the vehicle yaw moment is not controlled.

Generally, the vehicle motion is defined by a force generated in backward and forward direction (hereinafter referred as "longitudinal force"), a lateral force, and a yaw moment of the vehicle. The longitudinal force, the lateral force, and the yaw moment of the vehicle are determined based on the direction and the strength of the force that each wheel generates relative to the road surface. In order to achieve a stable and appropriate vehicle travel that corresponds with the driving operation of the driver, the longitudinal force, the lateral force, and the yaw moment of the vehicle must be controlled based on respective target values that correspond to a steering operation, a driving force operation, and a braking force operation. Accordingly, the strength and the direction of the force generated by each wheel relative to the road surface must be controlled so that the longitudinal force, the lateral force, and the yaw moment of the vehicle are determined to be the respective target values.

Thus, according to the aforementioned known driving control device, because only braking and driving force are controlled based on the premise that the steering angle of a steering wheel corresponds to the steering operation of the driver and the steering angle of non-steering wheels is invariable, there is a limitation on the control range of the strength and the direction of the force that each wheel generates. Accordingly, the performance of the wheel (i.e., tire) cannot be demonstrated to the best of its potential, and thus, there is a need for improvements in the drivability of the foregoing known driving control device.

In conventional driving control devices, generally, the braking and driving force of respective wheels are independently controlled by a feedback control so that a deviation between a target behavior index of the vehicle, and an actual behavior index of the vehicle, is reduced. The vehicle motion control is performed based on how much the actual behavior of the vehicle has deviated from the target behavior. The feedback gain cannot be raised due to the necessity for ensuring the stability of the control such as prevention of a vehicle hunting. Thus, it has been difficult to effectively control the vehicle motion control.

SUMMARY OF THE INVENTION

Thus, the device and methods of the present invention consider the above-mentioned problems in the known driving control device which is constructed to control vehicle motion by controlling braking and driving force of independent wheel. The present invention improves the drivability compared to the known driving control device so that the vehicle motion can be securely and effectively controlled.

Accordingly, it is an object of the present invention to improve the drivability of a vehicle by expanding the control range of the strength and the direction of the force generated by each wheel by controlling steering angle of each wheel, and by controlling each wheel to meet the necessary strength and direction for achieving the appropriate vehicle motion that corresponds with the driving operation of the driver.

It is further object of the present invention to individually control a steering angle and a braking and driving force of each wheel by a steering angle controller and a braking and driving force controller.

In light of the foregoing, the present invention provides a driving control device and methods which include a first detector that detects a steering operation amount by a driver, a second detector that detects a driving force operation amount by the driver, and a third detector that detects a braking force operation amount by the driver. Moreover, a first calculator calculates a vehicle target longitudinal force, a vehicle target lateral force, and a vehicle target yaw moment based on the amounts detected by the detectors. A second calculator calculates a target generating force of each wheel based on the target longitudinal force, the target lateral force, and the target yaw moment, and a third calculator calculates a target steering angle and a target braking and driving force of each wheel based on the target generating force of each wheel. Finally, a first controller controls a steering angle and braking and driving torque of each wheel to be the target steering angle and the target braking and driving torque, respectively.

According to the present invention, the driving control device includes a second controller for independently controlling each wheel of the vehicle. The driving control device also calculates the vehicle target longitudinal force, the vehicle target lateral force, and the vehicle target yaw moment based on the amounts detected by the detectors. Moreover, it calculates the target generating force of each wheel based on the vehicle target longitudinal force, the vehicle target lateral force, and the vehicle target yaw moment, calculates the target steering angle and target braking and driving torque based on the target generating force of each wheel, and controls the steering angle and the braking and driving torque of each wheel to be determined as the target steering angle and the target steering and driving torque, respectively. Thus, the steering angle and the braking and driving torque of each wheel are controlled to correspond to the vehicle target longitudinal force, the vehicle target lateral force, and the vehicle target yaw moment by the generating force of each wheel. Accordingly, the vehicle drivability is significantly improved as compared to when only the braking and driving force of each wheel are controlled.

BRIEF DESCRIPTION OF THE DRAWINGS

These objects, features, advantages, technical and industrial significance of the invention will be better understood by reading the following detailed description of the preferred embodiments of the invention, when considered in connection with the accompanying drawings, in which.

DETAILED DESCRIPTION OF PREFERRED EMBODIMENTS

Figure 1:
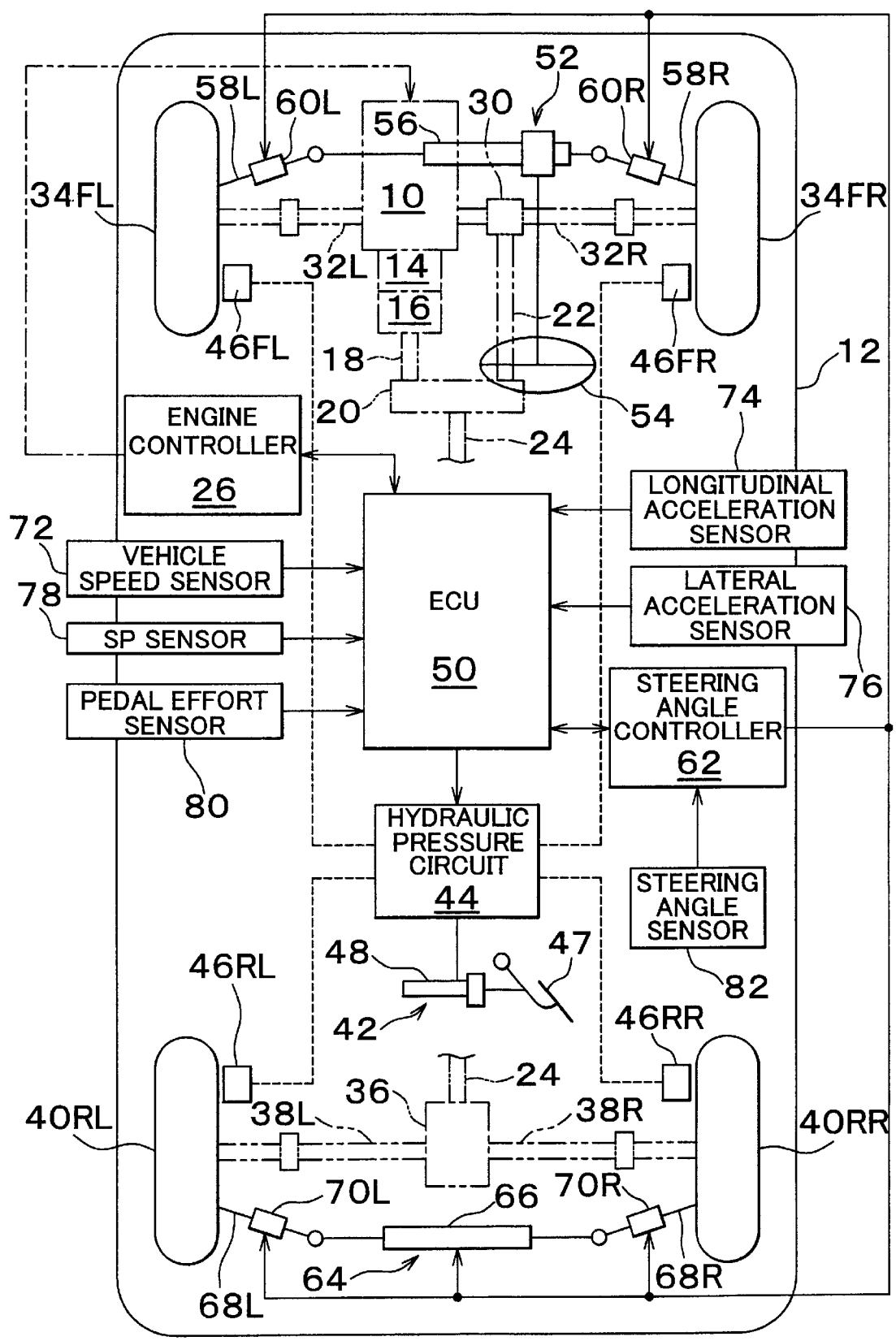
FIG. 1 is a schematic view of a driving control device according to a first embodiment of the present invention.

In the following description and the accompanying drawings, the present invention will be described in more detail in terms of preferred embodiments.
First Embodiment Referring to FIG. 1, an engine 10 is mounted on a vehicle 12 as a power source. The driving force of the engine 10 is transmitted to an output shaft 18 via a torque converter 14 and a transmission 16. The driving force of the output shaft 18 is transmitted to a front wheel propeller shaft 22 and a rear wheel propeller shaft 24 via a center differential 20. An output power of the engine 10 is controlled by an engine controller 26 in accordance with a depression of a throttle pedal (not shown) operated by a driver.

The driving force of the front wheel propeller shaft 22 is transmitted to a front right wheel axle 32R and a front left wheel axle 32L via a front wheel differential 30 to rotate right, left front wheels 34FR and 34FL. Likewise, the driving force of the rear wheel propeller shaft 24 is transmitted to a rear right axle 38R and a rear left axle 38L via a rear wheel differential 36 to rotate right, left rear wheels 40RR and 40RL.

The torque converter 14, the transmission 16, the center differential 20, the first wheel differential 30, and the rear wheel differential 36 structure a drivetrain of the vehicle. Particularly, the drivetrain according to the first embodiment distributes the driving torque of the engine 10 at a predetermined distribution ratio relative to right, left front wheels 34FR, 34FL, and right, left rear wheels 40RR, 40RL. The engine controller 26 totally controls the driving torque transmitted from the engine 10 to each wheel.

The braking force of the right, left front wheels 34FR, 34FL and right, left rear wheels 40RR, 40RL is controlled by controlling the braking pressure of corresponding wheel cylinders 46FR, 46FL, 46RR and 46RL by a hydraulic pressure circuit 44 of a braking controller 42. The hydraulic pressure circuit 44 includes a reservoir, an oil pump, and various valve devices (all of which are not shown). The braking force of each wheel cylinder is controlled by a master cylinder 48 actuated in accordance with a pedal effort to a brake pedal 47 at normal operation by a driver. When necessary, braking operation is independently controlled by a motion control ECU (Electronic Control Unit) 50 as explained in details hereinafter.

As shown in FIG. 1, the left, right front wheels 34FR, 34FL are steered by a front wheel steering device 52. According to the first embodiment, the front wheel steering device 52 includes a hydraulic pressure type power steering wheel 56 actuated in response to the operation of a steering wheel 54 by the driver. The right, left front wheels 34FR, 34FL are steered by the power steering device 56 via a tie rods 58R, 58L. The tie rods 58R, 58L are respectively provided with actuators 60R, 60L for variably controlling effective length thereof. The actuators 60R, 60L are controlled by a steering angle controller 62. Accordingly, the steering angles of the front wheels 34 FR and 34 FL are controlled independently of each other and also independently of the rear wheels 40RR and 40RL.

Likewise, right, left rear wheels 40RR, 40RL are steered by a rear wheel steering device 64. The rear wheel steering device 64 includes a hydraulic pressure type power steering device 66 actuated in response to the steering operation of the steering wheel 54 by the driver and vehicle speed. The right, left rear wheels 40RR, 40RL are steered by the power steering device 66 via tie rods 68R, 68L.

The tie rods 68 R, 68L are respectively provided with actuators 70R, 70L for variably controlling the effective length thereof. The power steering device 66 and actuators 70R, 70L are controlled by the steering angle controller 62. Accordingly, the steering angles of the right, left rear wheels 40RR, 40RL are controlled independently of each other and also independently of the front wheels 34FR, 34FL.

The front wheel steering device 52, the rear wheel steering device 64, and the steering angle controller 62 independently control the steering angle of each wheel 34FR, 34FL, 40RR, and 40RL. The engine 10, the engine controller 26, the braking device 42, and the ECU 50, by cooperating with one another, control each wheel independently. The ECU 50 independently controls the steering angle and the braking and driving forces.

The ECU 50 is input with a signal showing a vehicle speed Vx from a vehicle speed sensor 72, and a signal showing a longitudinal acceleration Gx and a lateral acceleration Gy of the vehicle 12 from a longitudinal acceleration sensor 74 and a lateral acceleration sensor 76 respectively. Moreover, the ECU 50 is input with a signal showing a shift position Ps of the transmission 16 from a shift position (SP) sensor 78, and a signal showing a pedal effort (i.e., the braking operation amount by the driver) relative to the brake pedal 47 from a pedal effort sensor 80. The braking operation amount by the driver may be detected by the pressure in the master cylinder 48 or the pedal stroke of the brake pedal 47.

The ECU 50 is also input with a signal showing a throttle opening Ta (i.e., the driving operation amount by the driver), a signal showing an engine rotation speed Ne from the engine controller 26 and a signal showing a steering angle θ (i.e., the steering operation amount by the driver) from a steering angle sensor 82 via a steering angle controller 62. The driving force operation amount by the driver may be detected by the pedal stroke of the throttle pedal.

The longitudinal acceleration sensor 74 detects the longitudinal acceleration which determines the acceleration direction of the vehicle as a positive direction. The lateral acceleration sensor 76 and a steering angle sensor 82 detect the lateral acceleration which determine the turning direction of the vehicle in left direction as a positive direction. The engine controller 26, the ECU 50, the steering angle controller 62 may be structured with a microcomputer and a driving circuit including CPU, ROM, RAM, and input-output device in practice.

Figure 2:
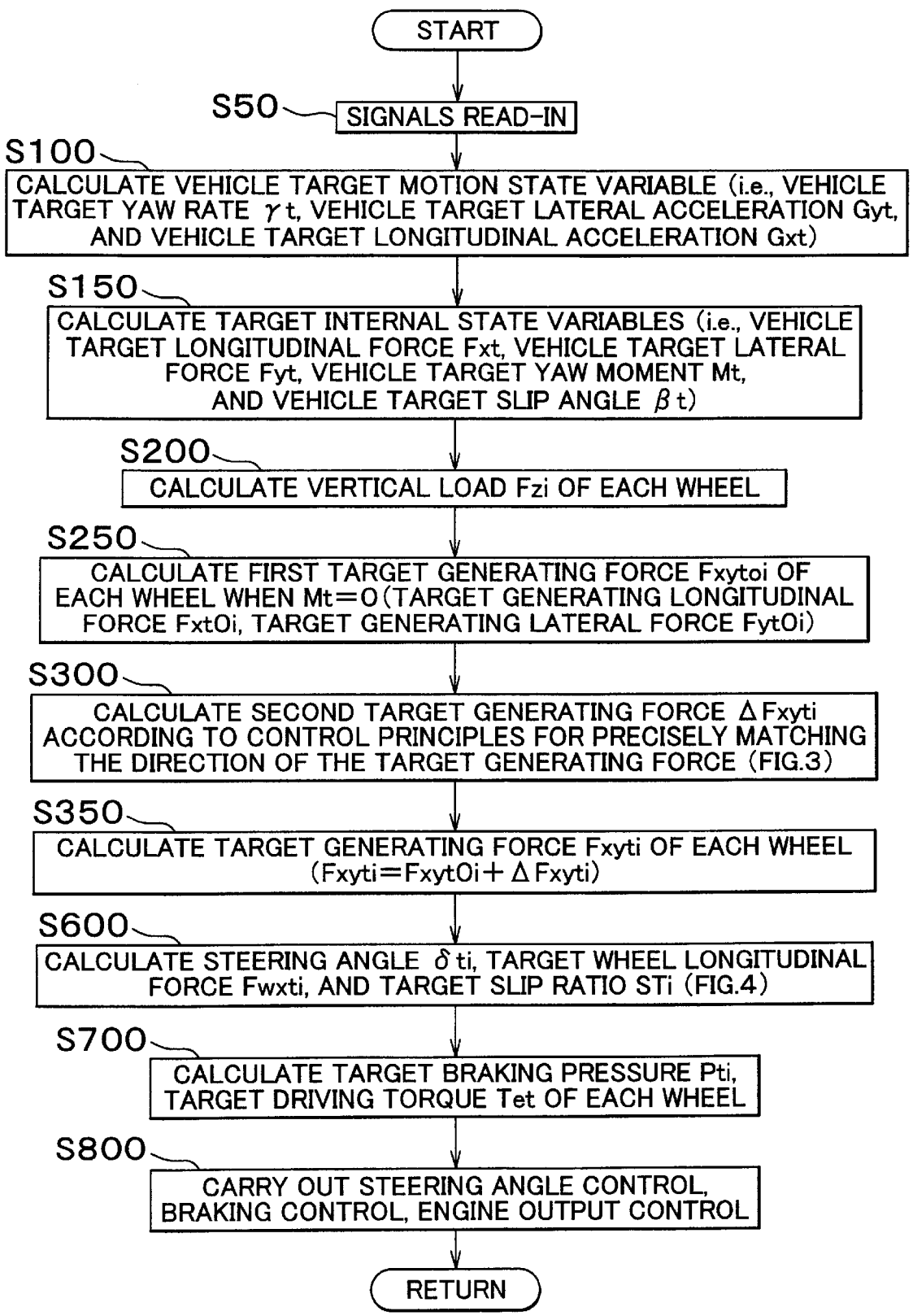
FIG. 2 is a flowchart showing a routine for motion control according to the first embodiment of the present invention.

Following a routine shown in FIG. 2, the motion control ECU 50 performs the following calculations. First, a vehicle target yaw rate γt, a vehicle target lateral acceleration Gyt, and a vehicle target longitudinal acceleration Gxt are calculated as a target motion state variable based on the vehicle speed Vx, etc. Second, a vehicle target longitudinal force Fxt corresponding to the target longitudinal acceleration Gxt, a vehicle target lateral force Fyt corresponding to the target lateral acceleration Gyt, a vehicle target yaw moment Mt corresponding to the target yaw rate γt, and a vehicle target slip angle βt are calculated as the target internal state variables of the vehicle based on the first calculation step.

Third, the motion control ECU 50 performs the following calculations. A vertical load Fzi (i.e., i=fl, fr, rl, rr) of each wheel is calculated based on the longitudinal acceleration Gx of the vehicle, etc.. A vehicle target generating force Fxyt is calculated as a resultant force of the vehicle target longitudinal force Fxt and the vehicle target lateral force Fyt. A first target generating force Fxyt0i (i.e., i=fl, fr, rl, rr) of each wheel (for achieving the vehicle target longitudinal force Fxt and the vehicle target lateral force Fyt by distributing the target generating force Fxyt to each wheel in accordance with the vertical load Fzi of each wheel) is calculated as a force having the direction corresponding to the direction of the vehicle target generating force Fxyt.

Fourth, the motion control ECU 50 performs the following calculations. A correction amount of the target generating force of each wheel for achieving only the vehicle target yaw moment Mt, that is, a second target generating force ΔFxyt (i.e., i=fl, fr, rl, rr), is calculated by control principles that precisely match the direction of the target generating force Fxyti of each wheel to the direction of the vehicle target generating force Fxyt. A target generating force Fxyti (i.e., i=fl, fr, rl, rr) of each wheel is calculated as the sum of the first target generating force Fxyt0i and the second target generating force ΔFxyti.

Fifth, the motion control ECU 50 performs the following calculations. A target steering angle δti of each wheel is calculated which determines the generating force of each wheel to be the target generating force Fxyti. Moreover, a target wheel longitudinal force Fwxti at wheel coordinates of each wheel, and a target slip ratio Sti (i.e., i=fl, fr, rl, rr) of each wheel are calculated. A target rotation torque Twti of each wheel is calculated based on the target wheel longitudinal force Fwxti of each wheel and the target slip ratio Sti. A target braking pressure Pti (i.e., i=fl, fr, rl, rr) of each wheel and a target driving torque Tet of the engine 10 are calculated based on the target rotation torque Twti of each wheel. The motion control ECU 50 outputs the command signal to the steering angle controller 62 and the engine controller 26 so that the steering angle äi of each wheel is determined to be the target steering angle äi and the output torque of the engine 10 is determined to be the target driving torque Tet. And the motion control ECU controls the braking device 42 so that a braking pressure Pi of each wheel is determined to be the target braking pressure Pti.

Referring to flowcharts shown in FIGS. 2–5, a motion control routine of the vehicle according to the first embodiment of the present invention will be explained as follows. The control according to the main routine of the flowchart shown in FIG. 2 is started by turning on an ignition switch (not shown) and repeatedly carried out every predetermined time.

In Step 50, signals showing the vehicle speed Vx detected by the vehicle speed sensor 72 are read-in. In Step 100, the vehicle target yaw rate γt, the vehicle target lateral acceleration Gyt, and the vehicle target longitudinal acceleration Gxt are calculated as the vehicle target motion state variables based on the vehicle speed Vx.

For example, the target yaw rate γt is calculated according to Equation 1 using a steering gear ratio N, a wheel base L of the vehicle, a stability factor Kh, and a steering yaw rate transient transfer function H(s). The target lateral acceleration Gyt is calculated according to Equation 2 using a yaw rate lateral acceleration transient transfer function G(s). The target longitudinal acceleration Gxt is calculated according to Equation 3 using a function F (Ne, Ta, Rd, Fb) for calculating the vehicle target longitudinal acceleration Gxt having the engine rotation speed Ne, the throttle opening Ta, a gear ratio Rd of the drivetrain based on the shift position Ps of the transmission 16, and a pedal effort Fb relative to the brake pedal as variables.

$$\gamma t = \theta \cdot Vx / \{N \cdot L (1 + Kh \cdot Vx^2)\} Hs \tag{1}$$

$$Gyt = \gamma t \cdot Vx \cdot G(s) \tag{2}$$

$$Gxt = F(Ne, Ta, Rd, Fb) \tag{3}$$

In Step 150, the vehicle target longitudinal force Fxt corresponding to the vehicle target longitudinal acceleration Gxt, the vehicle target lateral force Fyt corresponding to the target lateral acceleration Gyt, the vehicle target yaw moment Mt corresponding to the target yaw rate γt, and the vehicle target slip angle βt are calculated as the target internal state variables of the vehicle.

The vehicle target longitudinal force Fxt and the target lateral force Fyt are calculated according to Equations 4 and 5 using a mass Mv of the vehicle. The target yaw moment Mt is calculated according to Equation 6 using a vehicle yaw moment of inertia Iy and a differential value γtd of the vehicle target yaw rate γt. The vehicle target slip angle βt is calculated according to Equation 7.

$$Fxt = Mv \cdot Gxt \tag{4}$$

$$Fyt = Mv \cdot Gyt \tag{5}$$

$$Mt = Iy \cdot \gamma td \tag{6}$$

$$\beta t = \int (Gyt / Vx - \gamma t) dt \tag{7}$$

Figure 8:
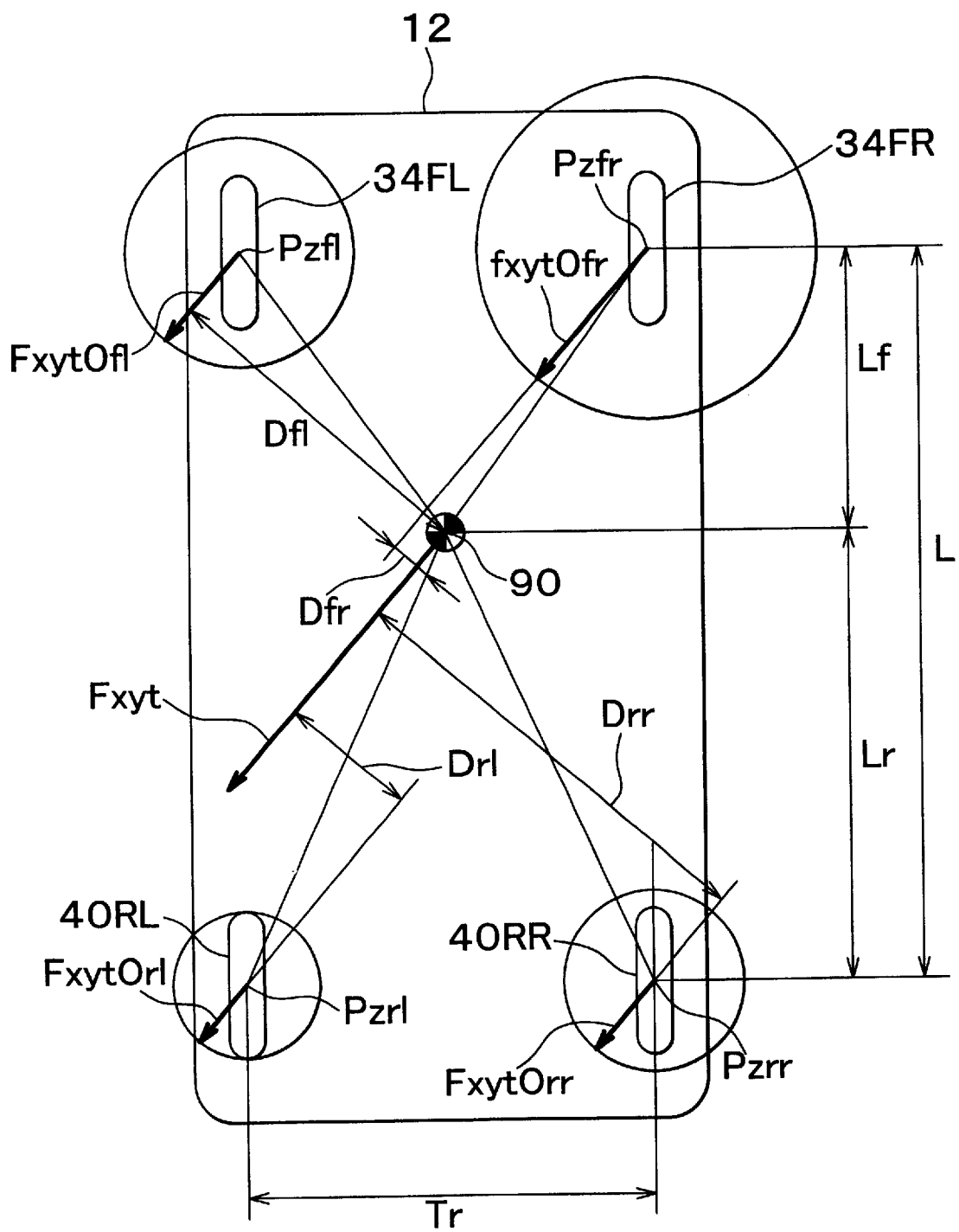
FIG. 8 is an explanatory view showing an arm length of each yaw moment given around a center of gravity of the vehicle by a first target generating force of each wheel.
Figure 11:
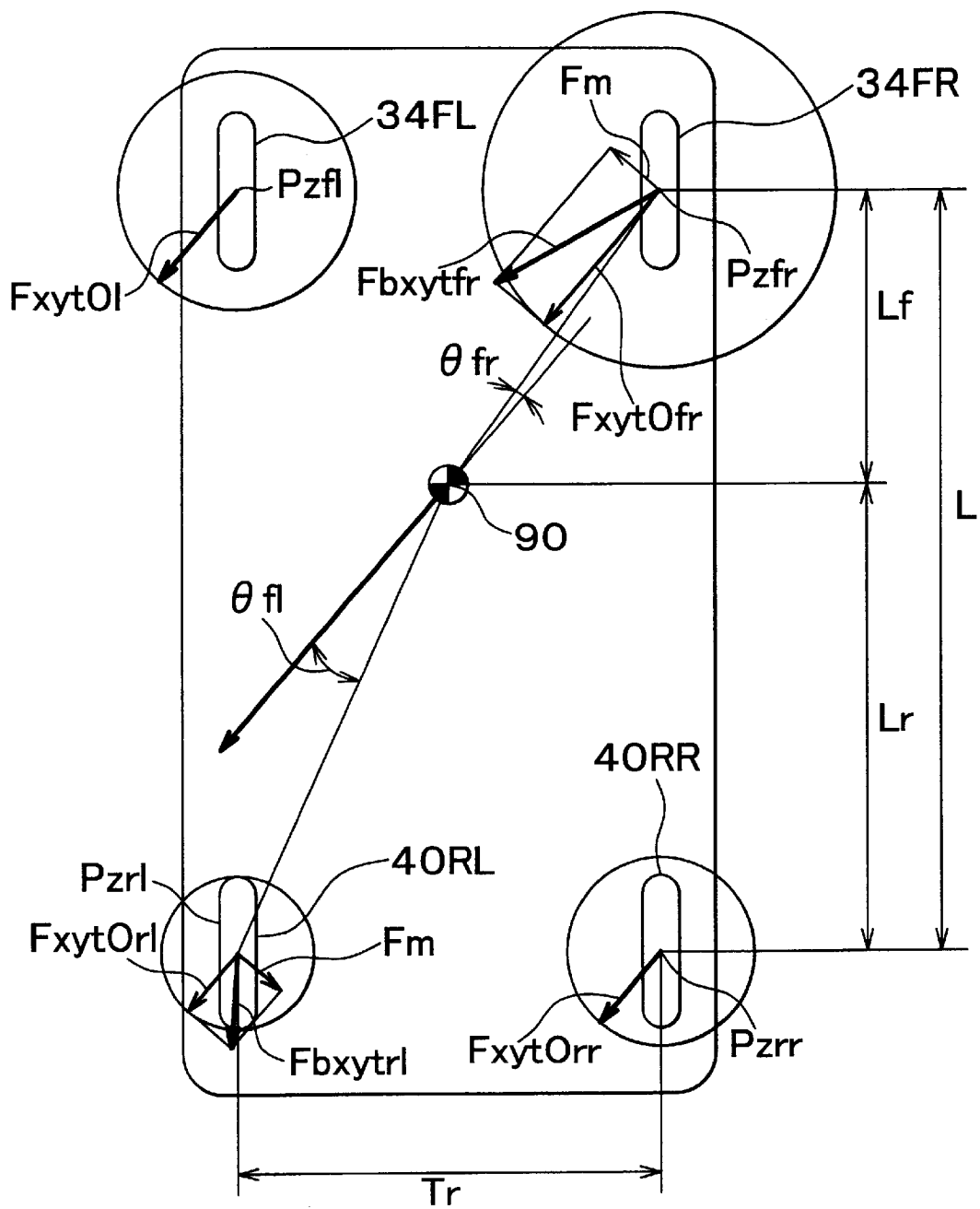
FIG. 11 is an explanatory view showing angles which are formed between respective vectors of target generating force of a front right wheel and a rear left wheel, and line segments connecting the center of gravity of the vehicle and the grounding point of the front right wheel and the rear left wheel respectively.

In Step 200, as shown in FIGS. 8 and 11, a distance between the center of the gravity 90 of the vehicle 12 and the rear wheel axle in longitudinal direction is determined to be a distance Lf. A distance between the center of the gravity 90 of the vehicle 12 and the rear wheel axle is determined to be a distance Lr. According to Equations 8–11, a vertical load Fzi (i.e., i=fl, fr, rl, rr) of each wheel is calculated using the distance Lf, the distance Lr, a height H of the center of the gravity 90 of the vehicle 12, roll stiffness elements of front and rear wheels Rf and Rr (Rf+Rr=1), a tread Tr of the vehicle 12, and a gravitational acceleration. The longitudinal acceleration Gx and the lateral acceleration Gy according to the Equations 8–11 may be estimated based on the vehicle speed Vx or may be the target longitudinal acceleration Gxt and the target acceleration Gyt.

$$Fzfl=Mv\cdot\{g\cdot Lr-Gx\cdot H\}/2L)-Gy\cdot H\cdot Rf/Tr\} \quad (8)$$

$$Fzfr=Mv\cdot\{g\cdot Lr-Gx\cdot H\}/(2L)+Gy\cdot H\cdot Rf/Tr\} \quad (9)$$

$$Fzrl=Mv\cdot\{g\cdot Lg+Gx\cdot H\}/(2L)-Gy\cdot H\cdot Rr/Tr\} \quad (10)$$

$$Fzrr=Mv\cdot\{g\cdot Lf+Gx\cdot H\}/(2L)+Gy\cdot H\cdot Rr/Tr\} \quad (11)$$

In Step 250, since the vehicle target generating force Fxyt is calculated as the resultant force of the target longitudinal force Fxt and the target lateral force Fyt according to Equation 12 and since Equation 13 is held, the target generating force of each wheel for achieving the vehicle target generating force Fxyt without giving the target yaw moment Mt to the vehicle, that is, the first target generating force Fxyt0i (i.e., i=fl, fr, rl, rr) of each wheel is calculated according to Equations 14–17.

$$Fxyt=(Fxt^2+Fyt^2)^{1/2} \quad (12)$$

$$Fzfr+Fzfl+Fzrr+Fzrl=Mv\cdot g \quad (13)$$

$$Fxyt0fl=Fxyt\cdot Fzfl/(Mv\cdot g) \quad (14)$$

$$Fxyt0fr=Fxyt\cdot Fzfr/(Mv\cdot g) \quad (15)$$

$$Fxyt0rl=Fxyt Fzrl/(Mv\cdot g) \quad (16)$$

$$Fxyt0rr=Fxyt\cdot Fzrr/(Mv\cdot g) \quad (17)$$

In this case, the components of the longitudinal direction of the vehicle and the lateral direction of the vehicle of the target generating force Fxyt0i of each wheel for achieving the vehicle target generating force Fxyt are determined to be Fxt0i and Fyt0i (i.e., i=fl, fr, rl, rr) respectively. When the total of the components of the vehicle of the right, left front wheels and the right, left rear wheels in lateral direction are determined to be Fyt0f and Fyt0r determined respectively, and when the total of the components of the front, rear right wheels and the front, rear left wheels in longitudinal direction are determined to be Fxt0R and Fxt0L respectively, a total force is determined as Equations 18–21.

$$Fyt0f=Fyt0fr+Fyt0fl \quad (18)$$

$$Fyt0r=Fyt0rr+Fyt0rl \quad (19)$$

$$Fxt0L=Fyt0fl+Fyt0rl \quad (20)$$

$$Fxt0R=Fyt0fr+Fyt0rr \quad (21)$$

The total force Fyt0f, Fyt0r, Fxt0L, and Fxt0R are determined as Equations 22–25 using a vertical load Fzf of the right, left front wheels, a vertical load Fzr of the right, left rear wheels, a vertical load FzL of the front, rear left wheels, and a vertical load FzR of the front, rear right wheels.

$$Fyt0f=Fzf\cdot Gyt/g \quad (22)$$

$$Fyt0r=Fzr\cdot Gyt/g \quad (23)$$

$$Fxt0L=FzL\cdot Gxt/g \quad (24)$$

$$Fxt0R=FzR\cdot Gxt/g \quad (25)$$

The total force Fyt0f, Fyt0r, Fyt0L, Fyt0R are determined by formulas 26–29 using the vertical load Fzf of the right, left front wheels, the vertical load Fzr of the right, left rear wheels, the vertical load FzL of the front, rear left wheels, and the vertical load FzR of the front, rear right wheels according to the foregoing formulas.

$$Fzf=Fzfr+Fzfl=Mv\cdot g\cdot Lr/L-Mv\cdot Gx\cdot H/L \quad (26)$$

$$Fzr=Fzrr+Fzrl=Mv\cdot g\cdot Lr/L+Mv\cdot Gx\cdot H/L \quad (27)$$

$$FzL=Fzfl+Fzrl=Mv\cdot g/2-Mv\cdot Gy\cdot H/Tr \quad (28)$$

$$FzR=Fzfr+Fzrr=Mv\cdot g/2+Mv\cdot Gy\cdot H/Tr \quad (29)$$

The vehicle target yaw moment Mt is calculated according to Equation 30 as follows. When the Equations 22–25 and 26–29 are substituted for Equation 30, right side of Equation 30 becomes zero. Accordingly, the first target generating force Fxyt0i of each wheel obtained by the Equations 14–17 does not give the yaw moment to the vehicle.

$$Mt=Iy\cdot\gamma td=Lf\cdot Fyt0f-Lr Fyt0r+(Fxt0L-Fxt0R)\cdot Tr/2 \quad (30)$$

Figure 3:
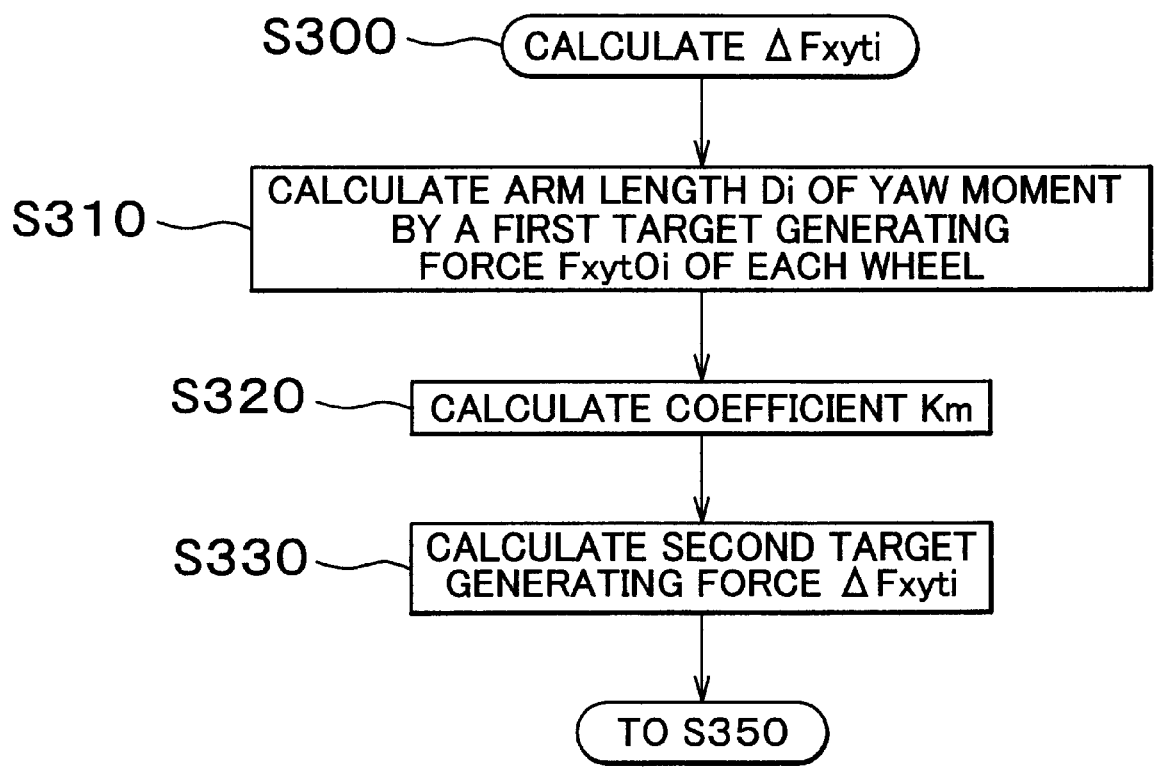
FIG. 3 is a more detailed flowchart showing a routine for calculating a second target generating force for each wheel.

In Step 300, according to the routine shown in FIG. 3, the correction amount of the target generating force of each wheel for achieving only the target yaw moment Mt of the vehicle, that is, the second target generating force ΔFxyti (i.e., i=fl, fr, rl, rr) is calculated by the control principles for precisely matching the direction of the target generating force Fxyti of each wheel to the direction of the target generating force Fxyt of the vehicle.

In Step 350, according to Equation 31, the target generating force Fxyti (i.e., i=fl, fr, rl, rr) of each wheel is calculated as a total of the first target generating force Fxyt0i of each wheel calculated in Step 250 and the second target generating force ΔFxyti of each wheel calculated in Step 300.

$$Fxyti=Fxyt0i+\Delta Fxyti \quad (31)$$

Figure 4:
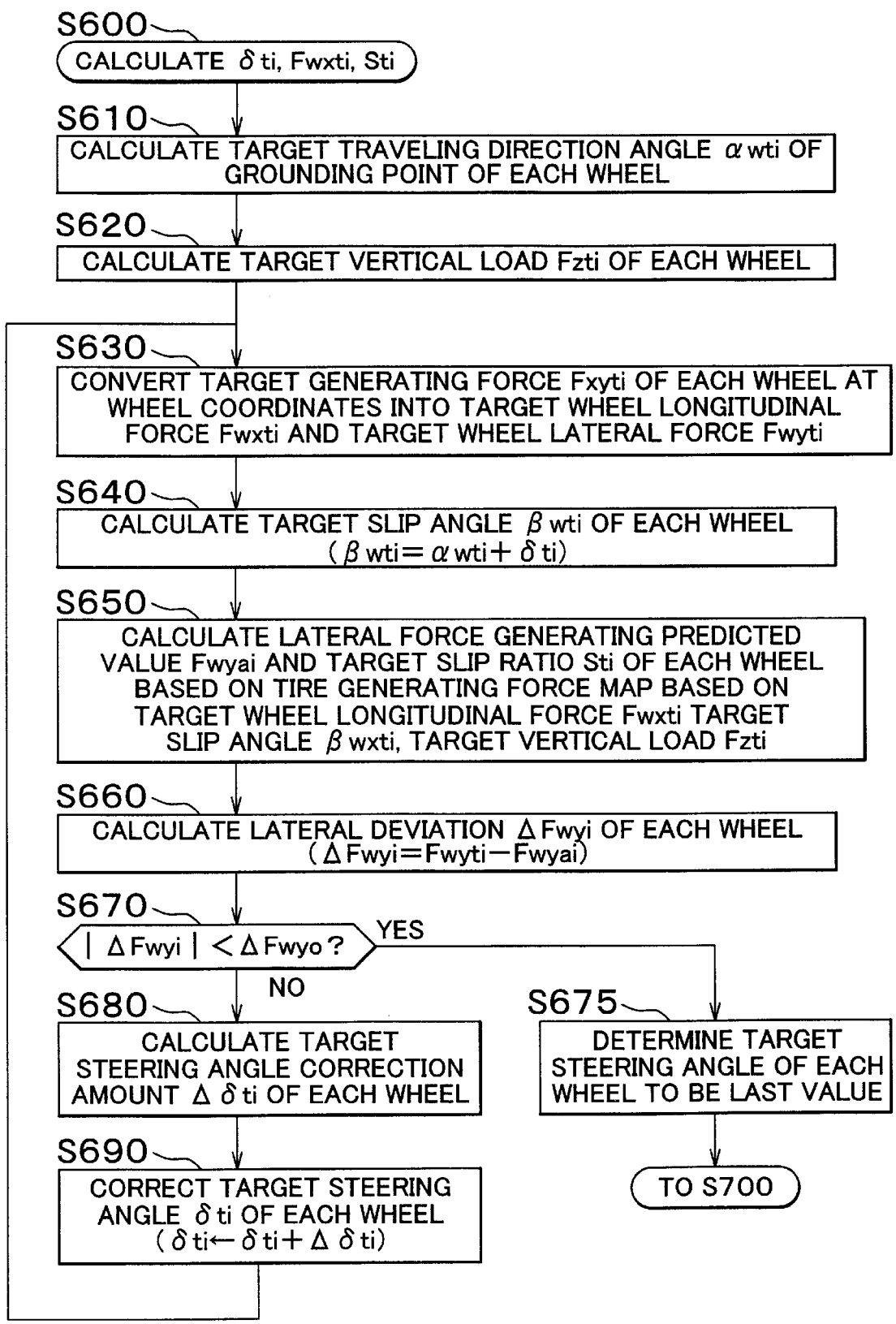
FIG. 4 is a more detailed flowchart showing a routine for calculating a target steering angle, a target wheel longitudinal force, and a target slip ratio for each wheel.

In Step 600, following a routine shown in FIG. 4, the target steering angle δti of each wheel, the target wheel longitudinal force Fwxti according to the wheel coordinate of each wheel, and the target slip ratio Sti (i.e., i=fl, fr, rl, rr) of each wheel are calculated.

Figure 5:
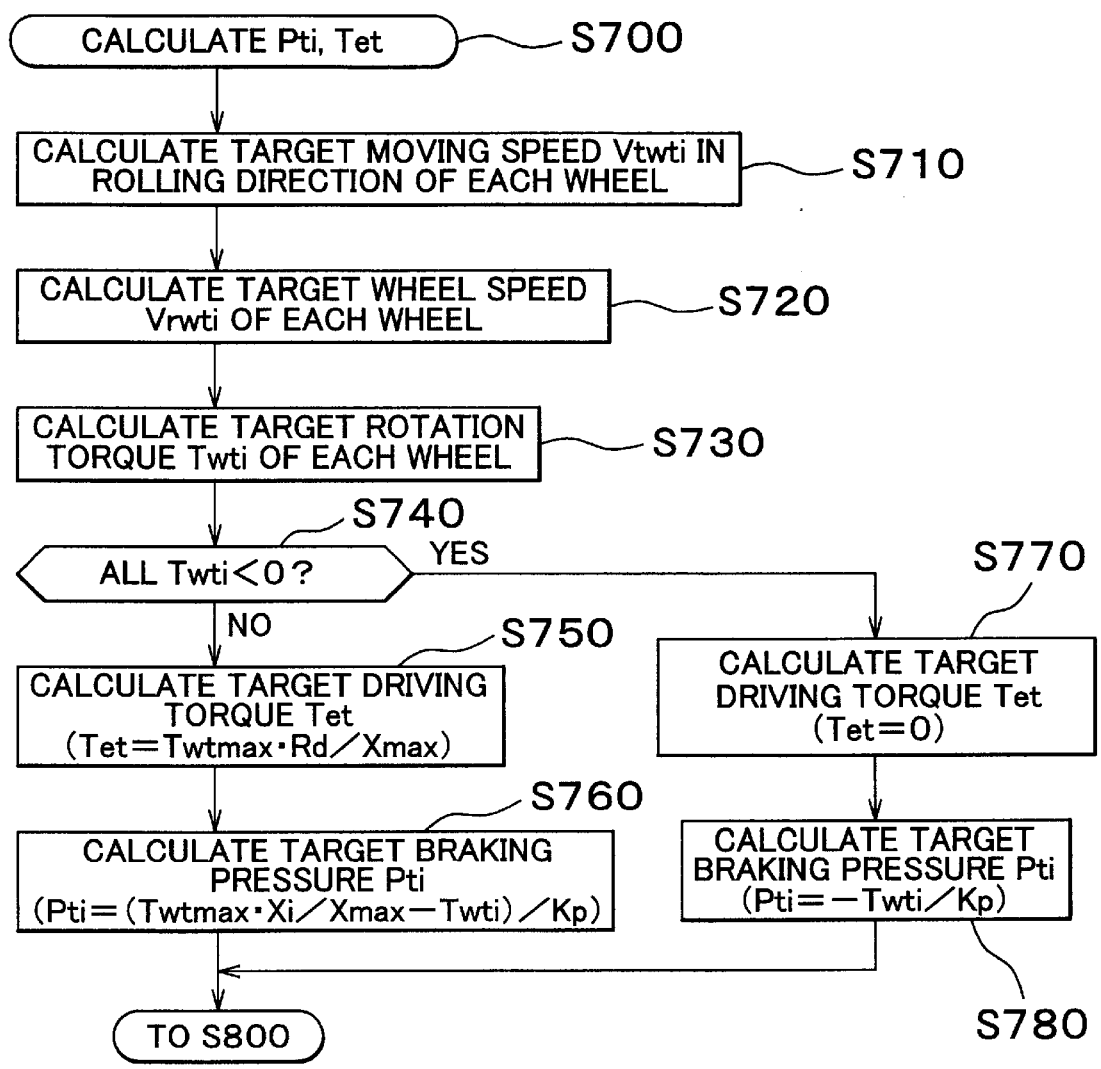
FIG. 5 is a more detailed flowchart showing a routine for calculating a target braking pressure and target driving torque of an engine for each wheel.

In Step 700, following a routine shown in FIG. 5, the target braking pressure Pti of each wheel and the target driving torque Tet of the engine 10 are calculated. In Step 800, the command signal is output to the steering angle controller 62 and the engine controller 26 so that the steering angle äi of each wheel is determined to be the target steering angle äti and the output torque of the engine 10 is determined to be the target driving torque Tet. The braking device 42 is controlled so that the braking pressure Pi of each wheel is determined to be the target braking pressure Pti. Accordingly, the generating force of each wheel is controlled by the corresponding target generating force Fxyti, then the routine is returned to Step 50.

According to Step 310 of the calculation routine of the second target generating force ΔFxyti of each wheel shown in FIG. 3, as shown in FIG. 8, the arm length Di (i.e., i=fl, fr, rl, rr) of each yaw moment given around the center of the gravity 90 of the vehicle 12 by the first target generating force Fxyt0i of each wheel calculated according to Step 250 is calculated according to Equations 32–35.

$$Dfl=|Fyt0fl\cdot Tr/2+Fxt0fl\cdot Lf| \quad (32)$$

$$Dfr=|-Fyt0fr\cdot Tr/2+Fxt0fr\cdot Lf| \quad (33)$$

$$Drl=|Fyt0rl\cdot Tr/2-Fxt0rl\cdot Lr| \quad (34)$$

$$Drr=|-Fyt0rr\cdot Tr/2-Fxt0rr\cdot Lr| \quad (35)$$

Referring to FIGS. 8 and 11, circles having a grounding point Pzi (i.e., i=fl, fr, rl, rr) of each wheel as a center of each wheel respectively show the relationship of the vertical load Fzi of each wheel, that is, the relationship of the frictional circles in terms of size.

In Step 320, when the total of the second target generating force ΔFxytfr and ΔFxytfl of the right, left front wheels and the total of the second target generating force ΔFxytrr and ΔFxytrl of the right, left rear wheels for achieving only the target yaw moment Mt of the vehicle are determined to be ΔFxyt, respectively, and when the total force ΔFxyt is distributed in accordance with the vertical load of right and left wheels, Equation 36 is held. Accordingly, a coefficient Km of the total force ΔFxyt according to the third equation of the right side of the Equation 36 will be calculated according to Equation 37.

$$Mt=Iy\cdot\gamma\gamma td=\{(Fzfr\cdot Dfr+Fzfl\cdot Dfl)/(Fzfr+Fzfl)\}\cdot\Delta Fxyt+\{(Fzrr\cdot Drr+Fzrl\cdot Drl)/(Fzrr+Fzrl)\}\cdot\Delta Fxyt=\{(Fzfr\cdot Dfr+Fzfl\cdot Dfl)/(Fzfr+Fzfl)\}+\{(Fzrr\cdot Drr+Fzrl\cdot Drl)/(Fzrr+Fzrl)\}\cdot\Delta Fxyt \quad (36)$$

$$Km=(Fzfr\cdot Dfr+Fzfl\cdot Dfl)/(Fzfr+Fzfl)+(Fzrr\cdot Drr+Fzrl\cdot Drl)/(Fzrr+Fzrl) \quad (37)$$

In Step 330, according to Equations 38–41, the second target generating force ΔFxyti (i.e., i=fl, fr, rl, rr) of each wheel for achieving only the target yaw moment Mt of the vehicle is calculated.

$$\Delta Fxytfl=\{Fzfl/(Fzfr+Fzfl)\}\cdot\Delta Fxyt=\{Fzfl/(Fzfr+Fzfl)\}\cdot Iy\cdot\gamma td/Km \quad (38)$$

$$\Delta Fxytfr=\{Fzfr/(Fzfr+Fzfl)\}\cdot\Delta Fxyt=\{Fzfr/(Fzfr+Fzfl)\}\cdot Iy\cdot\gamma td/Km \quad (39)$$

$$\Delta Fxytrl=-\{Fzrl/(Fzrr+Fzrl)\}\cdot\Delta Fxyt=-\{Fzrl/(Fzrr+Fzrl)\}\cdot Iy\cdot\gamma td/Km \quad (40)$$

$$\Delta Fxytrr=-\{Fzrr/(Fzrr+Fzrl)\}\cdot\Delta Fxyt=-\{Fzrr/(Fzrr+Fzrl)\}\cdot Iy\cdot\gamma td/Km \quad (41)$$

Figure 9:
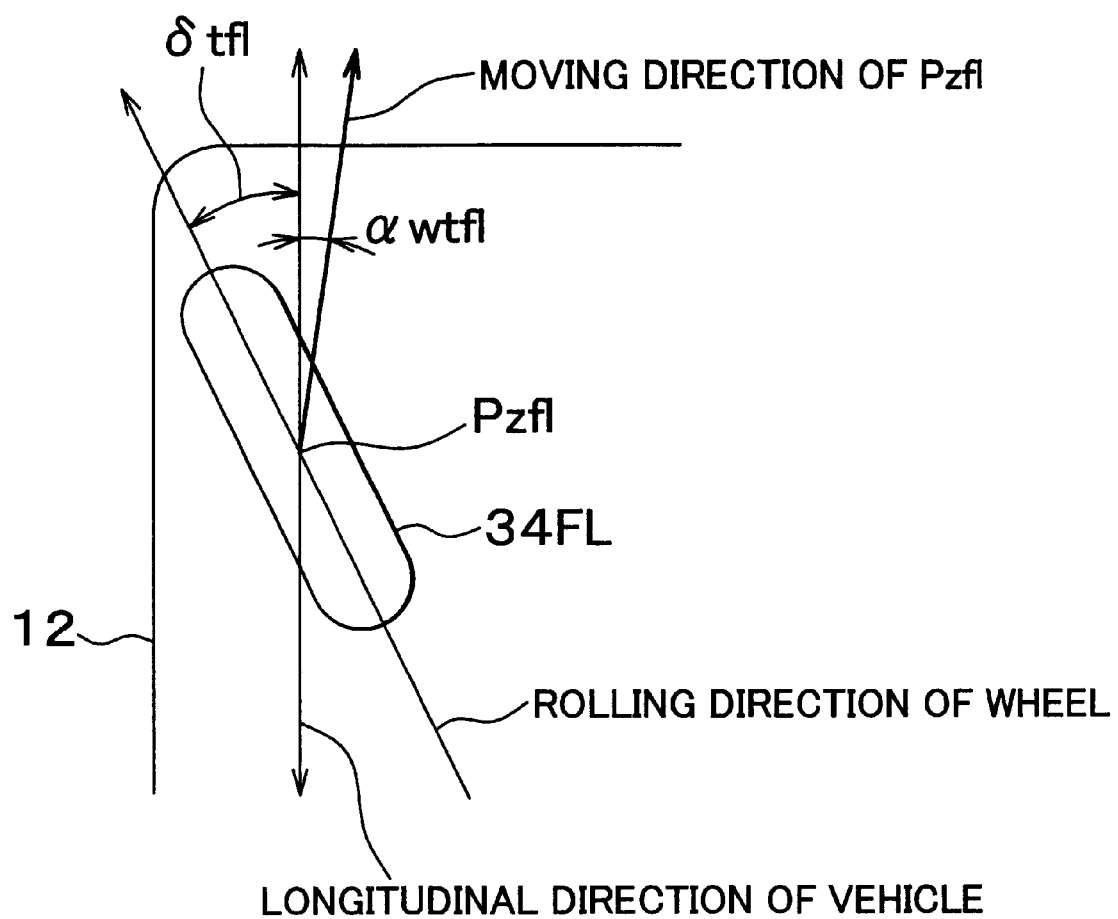
FIG. 9 is an explanatory view showing a target traveling direction angle of a grounding point of a front left wheel.

In Step 610 of the calculation routine of the target steering angle δti of each wheel, the target wheel longitudinal force Fwxti of each wheel, and the target slip ratio Sti of each wheel shown in FIG. 4, a target traveling direction angle αwti (i.e., i=fl, fr, rl, rr) of the grounding point of each wheel is calculated according to Equations 42–45. As shown in FIG. 9, the target traveling direction angle αwti at the grounding point corresponds to an angle of the target traveling direction of the grounding point Pzi of each wheel relative to the longitudinal direction of the vehicle.

$$\alpha wtfl=(\beta t\cdot Vx+Lf\cdot\gamma t)/(Vx-Tr\cdot\gamma t/2) \quad (42)$$

$$\alpha wtfr=(\beta t\cdot Vx+Lf\cdot\gamma t)/(Vx+Tr\cdot\gamma t/2) \quad (43)$$

$$\alpha wtrl=(\beta t\cdot Vx-Lr\cdot\gamma t)/(Vx-Tr\cdot\gamma t/2) \quad (44)$$

$$\alpha wtrr=(\beta t\cdot Vx-Lr\cdot\gamma t)/(Vx+Tr\cdot\gamma t/2) \quad (45)$$

In Step 620, the target vertical load Fzti (i.e., i=fl, fr, rl, rr) of each wheel is calculated based on the target longitudinal acceleration Gxt and the target lateral acceleration Gyt of vehicle according to Equations 46–49 which correspond to the foregoing Equations 8–11 respectively.

$$Fztfl=Mv\cdot\{g\cdot Lr-Gxt\cdot H\}/(2L)-Gyt\cdot H\cdot Rf/Tr\} \quad (46)$$

$$Fztfr=Mv\cdot\{g\cdot Lr-Gxtv\cdot H\}/(2L)+Gyt\cdot H\cdot Rf/Tr\} \quad (47)$$

$$Fztrl=Mv\cdot\{g\cdot Lf+Gxt\cdot H\}/(2L)-Gyt\cdot H\cdot Rr/Tr\} \quad (48)$$

$$Fztrr=Mv\cdot\{g\cdot Lf+Gxt\cdot H\}/(2L)+Gyt\cdot H\cdot Rr/Tr\} \quad (49)$$

Figure 10:
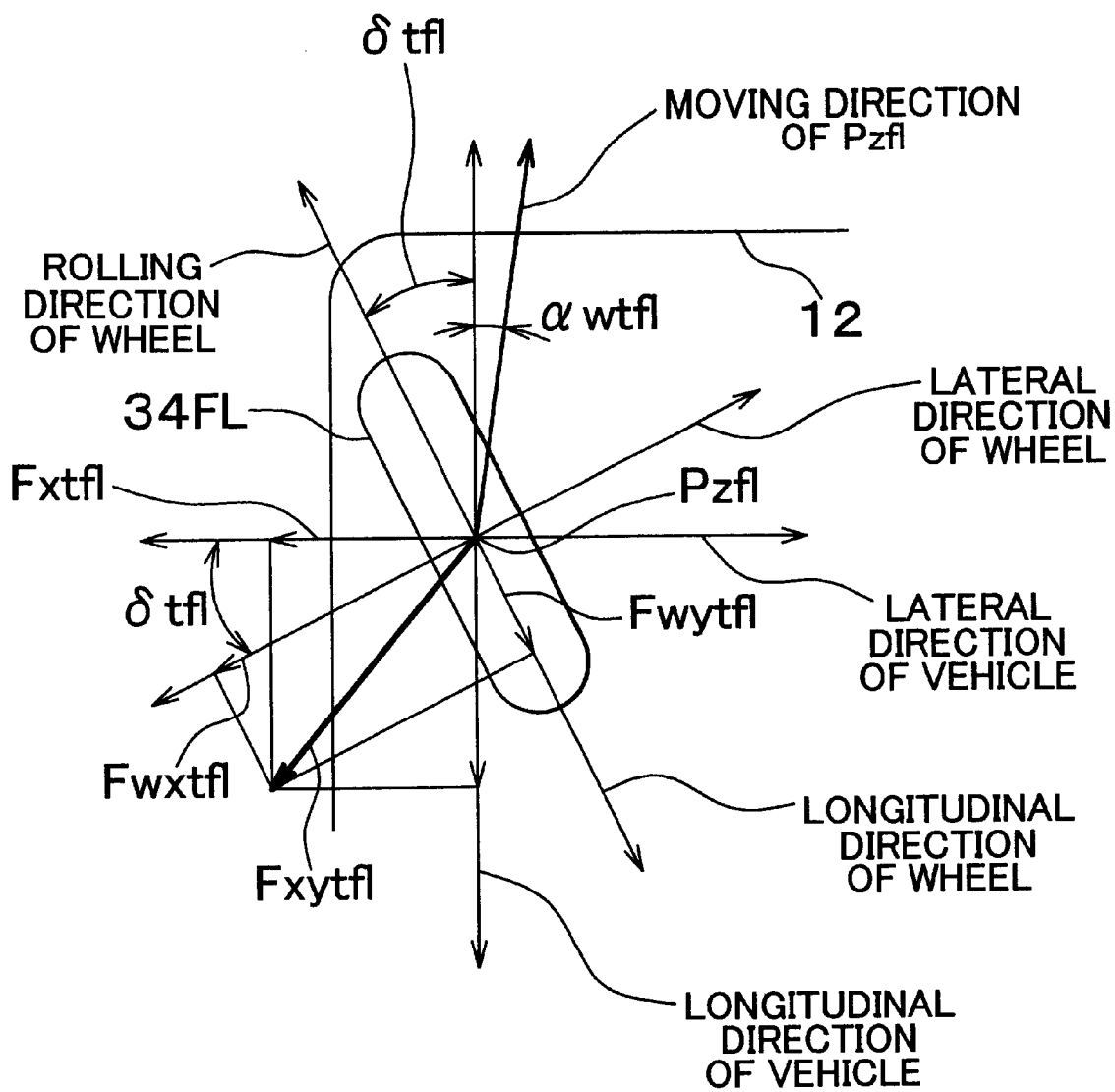
FIG. 10 is an explanatory view showing that a target generating force of a front left wheel is resolved into a target wheel longitudinal force and a target wheel lateral force.

In Step 630, as shown in FIG. 10 regarding the front left wheel, values that the target generating force Fxyti of each wheel is resolved into the target longitudinal force and the target lateral force at the wheel coordinates of each wheel, that is, the target wheel longitudinal force Fwxti and a target wheel lateral force Fwyti (i.e., i=fl, fr, rl, rr) are calculated according to Equations 50 and 51 as follows.

$$Fwxti=Fxyti\cdot\cos(\pi/2-\delta ti)=Fxyti\cdot\sin\delta ti \quad (50)$$

$$Fwyti=Fxyti\cdot\sin(\pi/2-\delta ti)=Fxyti\cdot\cos\delta ti \quad (51)$$

In Step 640, the target slip angle βwti (i.e., i=fl, fr, rl, rr) of each wheel is calculated as the sum of the grounding point target traveling direction angle αwti and the target steering angle δti of each wheel according to Equation 52.

$$Bwti=\alpha wti+\delta ti \quad (52)$$

In Step 650, a lateral force predicted value Fwyai and the target slip ratio Sti (i.e., i=fl, fr, rl, rr) of each wheel are calculated by equations based on a tire generating force map or tire model (not shown) based on the target wheel longitudinal force Fwxti of each wheel, the target slip angle βwxti of each wheel, and the target vertical load Fzti of each wheel.

In Step 660, a deviation ΔFwyi (i.e., i=fl, fr, rl, rr) between the target wheel lateral force Fwyti and the lateral force predicted value Fwyai is calculated according to Equation 53.

$$\Delta Fwyi=Fwyti-Fwyai \quad (53)$$

Transactions of steps 670–690 are carried out to each wheel, for example, in order of front left wheel, front right wheel, rear left wheel, and rear right wheel. Particularly, in Step 670, whether the absolute value of the deviation ΔFwyi of the wheel lateral force is less than a reference value ΔFwyo (i.e., positive constant) is determined, that is, whether the correction of the target steering angle δti is not required is determined. When it is determined that the correction is required, the routine advances to Step 680. When it is determined that the correction is not required, the routine advances to Step 675 to determine the target steering angle δti to be a previous value. Then, the routine advances to Step 700 where a calculation of the target braking pressure Pti of each wheel and the target driving torque Tet is performed. This routine will be discussed with reference to FIG. 5.

In Step 680, a correction amount Δδti (i.e., i=fl, fr, rl, rr) of the target steering angle of each wheel is calculated using a positive constant Ks according to Equation 54. In Step 690, the target steering angle δti (i.e., i=fl, fr, rl, rr) of each wheel is corrected to δti+δti. Then, the routine is returned to Step 630.

$$\Delta\delta ti=Ks\cdot\Delta Fwyi \quad (54)$$

According to Step 710 in FIG. 5, a target longitudinal speed Vwxti (i.e., i=fl, fr, rl, rr) at the grounding point of each wheel is calculated according to Equations 55–58 and a target moving speed Vtwti (i.e., i=fl, fr, rl, rr) in rolling direction of each wheel is calculated according to Equation 59.

$$Vwxtfl=Vx+Tr\cdot\gamma/2 \quad (55)$$

$$Vwxtfr=Vx-Tr\cdot\gamma/2 \quad (56)$$

$$Vwxtrl=Vwxtfl \quad (57)$$

$$Vwxtrr=Vwxtfr \quad (58)$$

$$Vtwti=Vwxti(\cos\delta ti-\tan\beta wti\cdot\sin\delta ti) \quad (59)$$

In Step 720, a target wheel speed Vrwti (i.e., i=fl, fr, rl, rr) of each wheel is calculated according to Equation 60 based on the target slip ratio Sti and the target moving speed Vrwti of rolling direction.

$$Vrwti = (1 - Sti) \cdot Vrwti \qquad (60)$$

In Step 730, a target wheel acceleration Vrwtdi (i.e., i=fl, fr, rl, rr) of each wheel is calculated as, for example, time differential value of the target wheel speed Vrwti. The target rotation torque Twti of each wheel (i.e., i=fl, fr, rl, rr) is calculated using an effective radius Rw of the wheel and a rotational moment of inertia Iw of the wheel according to Equation 61.

$$Twti = Fwxti \cdot Rw + Iw \cdot Vrwtdi \qquad (61)$$

In Step 740, whether the target rotation torque Twti of all wheels have negative value is determined, that is, whether the all wheels require the braking is determined. When it is determined that the target rotation torque Twti corresponds to negative value, the routine advances to Step 770. When it is determined that the target rotation torque Twti does not correspond to negative value, the routine advances to Step 750. In Step 750, a gear ratio Rd of the drivetrain is obtained based on the shift position Ps. The target driving torque Tet of the engine 10 is calculated according to Equation 62 using a distribution ratio Xi (i.e., i=fl, fr, rl, rr) of the driving torque of the engine 10 relative to each wheel by drivetrain system (0<Xi<0.5, Σxi=1), a maximum value Twtmax of the target rotation torque Twti of four wheels, and a driving torque distribution ratio Xmax of the wheel 2 by which the target rotation torque is the maximum value Twtmax (i.e., maximum driving torque wheel).

$$Tet = Twtmax \cdot Rd / Xmax \qquad (62)$$

In Step 760, the target braking pressure Pti of the maximum driving torque wheel is determined to be zero and the target braking pressure Pti of each wheel which is not the maximum driving torque wheel is calculated using a conversion coefficient Kp between the braking pressure and the braking torque according to Equation 63. Then, the routine advances to Step 800.

$$Pti = (Twtmax \cdot Xi / Xmax - Twti) / Kp \qquad (63)$$

In Step 770, the target driving torque Tet of the engine 10 is determined to be zero. In Step 780, the target braking pressure Pti of each wheel is calculated according to Equation 64. Then, the routine advances to Step 800.

$$Pti = -Twti / Kp \qquad (64)$$

Thus, according to the first embodiment of the present invention, in Step 100, the vehicle target yaw rate γt, the vehicle target lateral acceleration Gyt, and the vehicle target longitudinal acceleration Gxt are calculated as the vehicle target motion state variables based on the vehicle speed Vx. In Step 150, the vehicle target longitudinal force Fxt corresponding to the vehicle target longitudinal acceleration Gxt, the vehicle target lateral force Fyt corresponding to the target lateral acceleration Gyt, the vehicle target yaw moment Mt corresponding to the target yaw rate γt, and the vehicle target slip angle βt are calculated as the vehicle target internal state variables.

In Step 200, the vertical load Fzi of each wheel is calculated. In Step 250, the vehicle target generating force Fxyt is calculated as the resultant force of the vehicle target longitudinal force Fxt and the target lateral force Fyt, and the first target generating force Fxyt0i of each wheel for achieving the vehicle target generating force Fxyt without giving the yaw moment to the vehicle is calculated. In Step 300, the second target generating force ΔFxyti of each wheel for achieving only the vehicle target yaw moment Mt is calculated according to the control principles for precisely matching the direction of the target generating force Fxyti of each wheel to the direction of the vehicle target generating force Fxyt. In Step 350, the target generating force Fxyti of each wheel is calculated as the sum of the first target generating force Fxyt0i and the second target generating force ΔFxyti.

According to the first embodiment of the present invention, the target generating force Fxyti of each wheel can be calculated for precisely achieving the vehicle target longitudinal force Fxt, the target lateral force Fyt, the target yaw moment Mt, that is, for precisely achieving the vehicle target yaw rate γt, the vehicle target lateral acceleration Gyt, and the vehicle target longitudinal acceleration Gxt. Thus, the stable vehicle travel can be achieved in a desired motion condition in accordance with the steering operation amount (i.e., steering angle θ), the driving force operation amount (i.e., throttle opening Ta), and the braking operation amount (i.e., brake pedal effort Fb) by the driver.

Since the direction of the vehicle target generating force Fxyti of all wheels can be completely conformed to the direction of the vehicle target generating force Fxyt, a part of the force generated by each wheel that idly affects the body of the vehicle 12 as internal stress is prevented. Thus, the stable vehicle travel can be achieved by using the generated force by each wheel more effectively.

According to the first embodiment of the present invention, the target steering angle δti for achieving the target generating force Fxyti of each wheel, the target wheel longitudinal force Fwxti at wheel coordinates of each wheel, and the target slip ratio Sti of each wheel are calculated in Step 600. In Step 700, the target braking pressure Pti of each wheel and the target driving torque Tet of the engine are calculated. In Step 800, the command signal is output to the steering angle controller 62 and the engine controller 26 so that the steering angle δi of each wheel is determined to be the target steering angle δti and the output torque of the engine 10 is determined to be the target driving torque Tet. By controlling the braking device 42 to determine the braking pressure Pi of each wheel to correspond to the target braking pressure Pti, the generated force of each wheel is controlled by corresponding target generating force Fxyti respectively.

According to the first embodiment of the present invention, the steering angle and the braking force are controlled so that the generated force of each wheel is determined to be corresponding target generating force Fxyti respectively. Thus, compared to the known motion control device which controls only the braking force of the vehicle, the strength of the generating force of each wheel and the direction of the controlled range are expanded, the performance of the wheel (i.e., tire) can be effectively applied, and thus the generated force of each wheel can be more precisely controlled to be the corresponding target generating force Fxyti.

According to the first embodiment of the present invention, the vehicle longitudinal acceleration Gx, the lateral acceleration Gy, and the yaw rate γ are controlled to be the vehicle target longitudinal acceleration Gxt, the target lateral acceleration Gyt, and the target yaw rate γt, respectively, by performing the feed forward control of the steering angle and the braking and driving forces of each wheel so that the generated force of each wheel is determined to be respectively corresponding target generating force Fxyti. Thus, compared to the generally known motion control device in which the braking force of each wheel is independently controlled by the feedback control to reduce the deviation between the vehicle target behavior index and the actual behavior index of the vehicle, the vehicle motion can be controlled precisely and effectively in accordance with the driving operation by the driver without causing the problems such as delay in response and the hunting.

According to the first embodiment of the present invention, in Step 600, the target steering angle δti of each wheel, the target wheel longitudinal force Fwxti at the wheel coordinates of each wheel, and the target slip ratio Sti of each wheel are calculated in order to determine the generated force of each wheel to be the target generating force Fxyti. In Step 710 and 720, the target wheel speed Vrwti of each wheel is calculated based on the target slip ratio Sti. In Step 730, the target wheel acceleration Vrwdti of each wheel is calculated, and the target rotation torque Twti of each wheel is calculated based on the target wheel longitudinal force Fwxti and the target wheel acceleration Vrwdti of each wheel. Thus, compared to when the target wheel acceleration Vrwdti calculated based on the target slip ratio Sti of each wheel is not taken into the consideration, the target rotation torque Twti of each wheel can be calculated precisely.

According to the first embodiment of the present invention, the target driving torque Tet of the engine 10 as the power source is calculated based on the maximum value Twtmax of the driving side in the target rotation torque Twti of each wheel. The target braking pressure Pti is calculated based on the maximum values Twtmax regarding the other wheels (not the wheels with the maximum target rotation torque) and the target rotation torques Twti of the other wheels. Thus, the generated force of each wheel can be easily and more precisely controlled to be the target generating force Fxyti by controlling the driving torque of the engine 10 to be the target driving torque Tet and the braking pressure Pi of the other wheels to be the target braking pressure Pti.

According to the first embodiment of the present invention, in Step 660, the deviation ΔFwyti between the target wheel lateral force Fwyti and the lateral force predicted value Fwyati is calculated. In Steps 670–690, the target steering angle δti of the wheel is determined to be the previous target steering angle when the deviation ΔFwyti between the target wheel lateral force Fwyti and the lateral force predicted value Fwyati is less than the reference value. When the deviation ΔFwyti between the target wheel lateral force Fwyti and the lateral force predicted value Fwyati is equal to or greater than the reference value, the target steering angle correction amount Δδti is calculated based on the deviation ΔFwyti, and the corrected value of the previous target steering angle corrected with the target steering correction amount Δδti is determined to be the target steering angle Δti of the wheel. Thus, the target steering angle δti of each wheel can be precisely calculated without being diverged.

Second Embodiment

Figure 6:
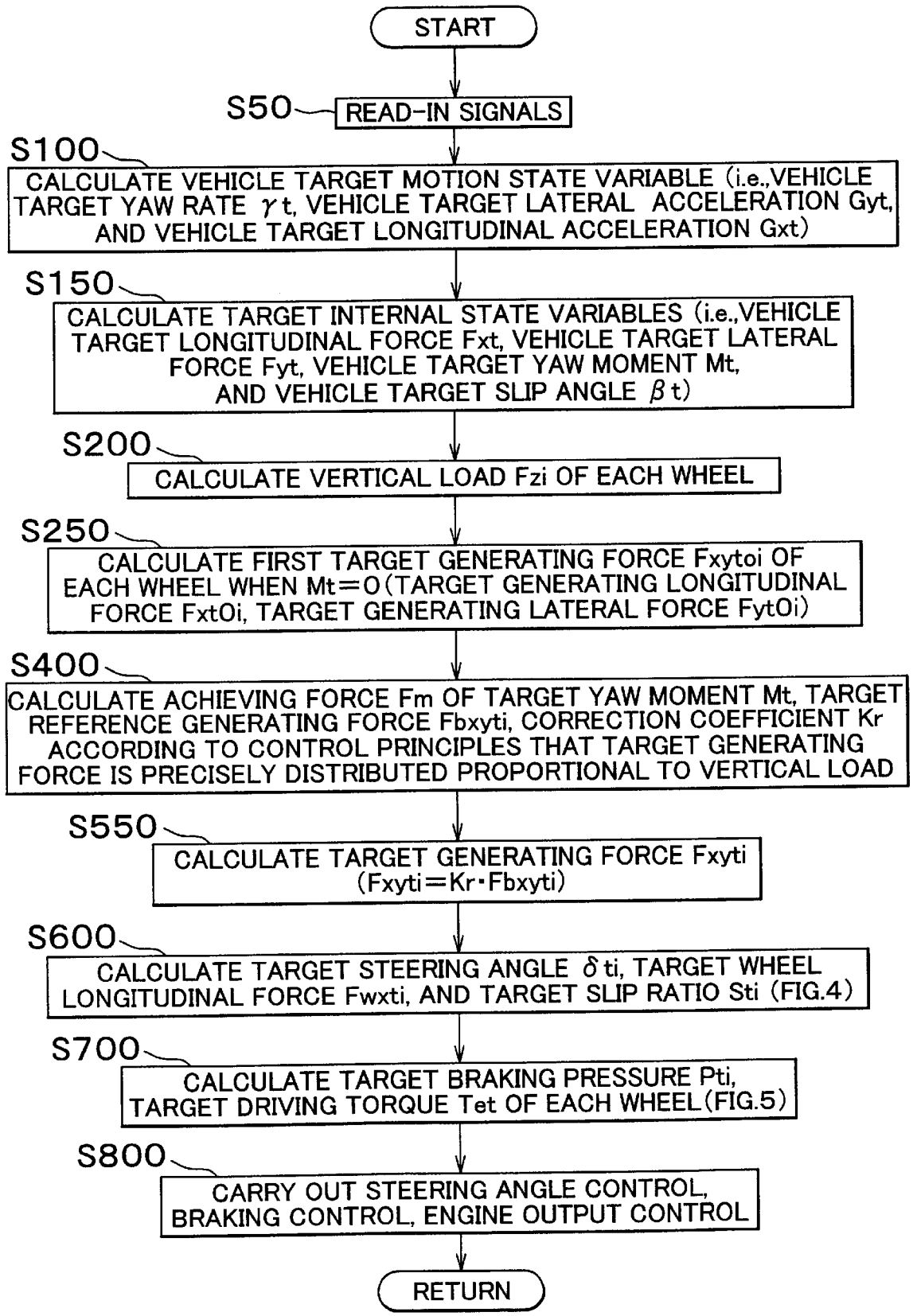
FIG. 6 is a flowchart showing a routine for motion control according to a second embodiment of the present invention.

FIG. 6 shows a routine of steering angle control and braking and driving control of each wheel of a driving control device of four-wheel vehicles according to a second embodiment of the present invention. According to FIG. 6, the same numeral is provided to the transactions corresponding to the steps in FIG. 2.

Figure 7:
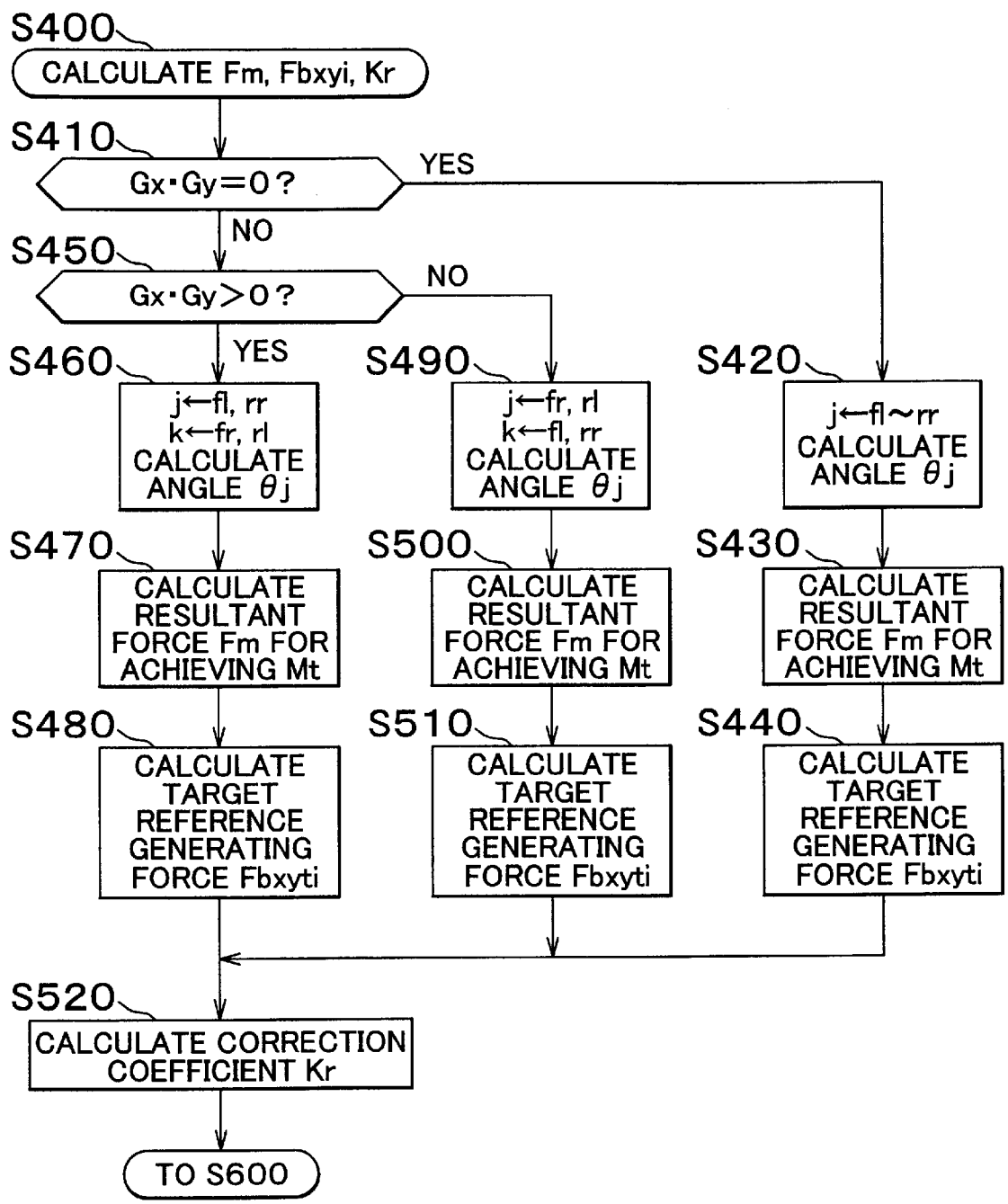
FIG. 7 is a more detailed flowchart showing a routine for calculating an achieving force for a target yaw moment, a target reference generating force for each wheel, and a correction coefficient of the vehicle.

The processes of Steps 50–250 and 600–800 of the second embodiment are the same as the foregoing first embodiment. In Step 400 of FIG. 7, carried out after Step 250, a resultant force Fm of a generated force (i.e., a second target generating force) of each wheel for achieving only the target yaw moment Mt of the vehicle, a target reference generating force Fbxyti (i.e., i=fl, fr, rl, rr) of each wheel, and a correction coefficient Kr for the target reference generating force of each wheel are calculated by control principles that allow the target generating force Fxyt of the vehicle to be precisely distributed proportional to the vertical load of each wheel.

In Step 550, the target generating force Fxyti of each wheel is calculated as the product of the correction coefficient Kr and the target reference generating force Fbxyti according to Equation 65. Then, the routine advances to Step 600.

$$Fxyti = Kr \cdot Fbxyti \quad (65)$$

In Step 410, which is a calculation routine of the resultant force Fm of the second target generating force of each wheel, the vehicle target reference generating force Fbxyti, and the correction coefficient Kr, it is determined whether the product of the longitudinal acceleration Gx of the vehicle and the lateral acceleration Gy of the vehicle is zero, that is, whether either one or both of the longitudinal acceleration Gx of the vehicle and the lateral acceleration Gy of the vehicle are zero. When it is determined that the product of the longitudinal acceleration Gx and the lateral acceleration Gy is not zero, the routine advances to Step 450. When it is determined that the product of the longitudinal acceleration Gx and the lateral acceleration Gy corresponds to zero, the routine advances to Step 420.

In Step 420, wheels j in which the vector of the wheel generating force is rotated are determined to be fl, fr, rl, and rr, so that the wheel which achieves the target yaw moment Mt of the vehicle by vector rotation of the wheel generating force is specified to the right, left front wheels and right, left rear wheels. When the wheels j in which the vector of the wheel generating force is rotated correspond to the front right wheel fr and rear left wheel rl, as shown in FIG. 11, an angle θj (i.e., j=fl, fr, rl, rr) formed with the vector of the target generating force Fxyt0i of each wheel and a line connecting the grounding point Pzi of each wheel and the center of the gravity 90 of the vehicle is calculated according to Equations 66–69.

$$\theta fl = \tan^{-1} |Fxt0fl/Fyt0fl| - \tan^{-1} |2Lf/Tr| \quad (66)$$

$$\theta fr = \tan^{-1} |Fxt0fr/Fyt0fr| - \tan^{-1} |2Lf/Tr| \quad (67)$$

$$\theta rl = \tan^{-1} |Fxt0rl/Fyt0rl| - \tan^{-1} |2Lr/Tr| \quad (68)$$

$$\theta rr = \tan^{-1} |Fxt0rr/Fyt0rr| - \tan^{-1} |2Lr/Tr| \quad (69)$$

In Step 430, according to Equation 70, a resultant force for generating only the target yaw moment Mt of the vehicle, that is, the resultant force Fm of a second target generating force of four wheels specified at Step 420.

$$Fm = Iy \cdot \gamma t \Big/ \sum_{i=j} \cos\theta \quad (70)$$

In Step 440, the target reference generating force Fbxyti (i.e., i=fl, fr, rl, rr) of each wheel is calculated according to Equations 71–74.

$$Fbxytfl=(Fxyt0fl^2+Fm^2)^{1/2} \quad (71)$$

$$Fbxytfr=(Fxyt0fr^2+Fm^2)^{1/2} \quad (72)$$

$$Fbxytrl=(Fxyt0rl^2+Fm^2)^{1/2} \quad (73)$$

$$Fbxytrr=(Fxyt0rr^2+Fm^2)^{1/2} \quad (74)$$

In Step 450, whether the product of the longitudinal acceleration Gx of the vehicle and the lateral acceleration Gy of the vehicle Gy has positive value is determined. When it is determined that the product of the longitudinal acceleration Gx of the vehicle and the lateral acceleration Gy has negative value, the routine advances to Step 490. When it is determined that the product of the longitudinal acceleration Gx of the vehicle and the lateral acceleration Gy has positive value, the routine advances to Step 460. The longitudinal acceleration and the lateral acceleration of the vehicle applied as a product in Steps 410 and 450 may be estimated based on the vehicle speed Vx or the target longitudinal acceleration Gxt and the target lateral acceleration Gyt may be applied as the product.

In Step 460, the wheels j in which the vector of the wheel generating force is rotated is determined to be the front left wheel fl and rear right wheel rr so that the wheel for achieving the target yaw moment Mt of the vehicle by the vector rotation of the wheel generating force is specified to the front, left wheel and rear right wheel. Wheels k in which the vector of the wheel generating force is not rotated is determined to be the front right wheel fr and rear left wheel rl. The angle θj (i.e., j=fl, rr) which is formed with the target generating force Fxyt0fl and Fxyt0rr of the front left wheel and the rear right wheel and the line connecting the grounding point Pzfl, Pzrr of the front left wheel and the rear right wheel and the center of the gravity 90, respectively, is calculated according to the foregoing Equations 66 and 69.

In Step 470, the resultant force Fm for generating the target yaw moment Mt of the vehicle, that is, the resultant force of the second target generating force of the front left wheel and the rear right wheel is calculated according to the foregoing Equation 70. In Step 480, the target reference generating force Fbxyti of each wheel is calculated according to Equations 75–78.

$$Fbxytfl=(Fxyt0fl^2+Fm^2)^{1/2} \quad (75)$$

$$Fbxytfr=Fxyt0fr \quad (76)$$

$$Fbxytrl=Fxyt0rl \quad (77)$$

$$Fbxytrr=(Fxyt0rr^2+Fm^2)^{1/2} \quad (78)$$

In Step 490, the wheels j in which the vector of the wheel generating force is rotated are determined to be the front right wheel fr and rear left wheel rl, and the wheels k in which the vector of the wheel generating force is not rotated are determined to be the front left wheel and the rear right wheel so that the wheel for achieving the target yaw moment Mt of the vehicle by the vector rotation of the wheel generating force is specified to the front, right wheel and rear left wheel. The angle θj (i.e., j=fr, rl) which is formed with the vector of the target generating force Fxyt0fr and Fxyt0rl of the front right wheel and the rear left wheel and the line connecting the grounding point Pzfr, Pzrl of the front right wheel and the rear left wheel and the center of the gravity 90, respectively, is calculated according to the foregoing Equations 67 and 68.

In Step 500, the resultant force Fm for generating the target yaw moment Mt of the vehicle, that is, the resultant force of the second target generating force of the front right wheel and the rear left wheel is calculated according to the foregoing Equation 70. In Step 510, the target reference generating force Fbxyti of each wheel is calculated according to Equations 79–82.

$$Fbxytfl=Fxyt0fl \quad (79)$$

$$Fbxytfr=(Fxyt0fr+Fm^2)^{1/2} \quad (80)$$

$$Fbxytrl=(Fxyt0rl^2+Fm^2)^{1/2} \quad (81)$$

$$Fbxytrr=Fxyt0rr \quad (82)$$

In Steps 430, 470, 500, when the absolute value of the resultant force Fm is greater than the absolute value of a minimum value Fxyt0min of the first target generating force Fxyt0i of the wheels in Step 420, the resultant force Fm cannot be achieved even if the vector of the minimum value Fxyt0min of the first target generating force is rotated. Thus, the resultant force Fm is determined to be the minimum value Fxyt0min of the first target generating force Fxyt0i of the wheel.

In Step 520, the correction coefficient Kr is calculated as a value which satisfies Equation 83.

$$Kr\left\{\sum_{i=j}\sqrt{Fxyti^2-\left(\frac{Fm}{Kr}\right)^2}+\sum_{i=k}Fxyti\right\}=Fxyt \quad (83)$$

Thus, according to the second embodiment of the present invention, in Step 400, the resultant force Fm of the second target generating force for achieving only the target yaw moment Mt of the vehicle, the target reference generating force Fbxyti of each wheel, and the correction coefficient Kr for the target reference generating force of each wheel are calculated by the control principles for distributing the target generating force Fxyt of the vehicle precisely proportional to the vertical load of each wheel. In Step 550, the target generating force Fxyti of each wheel is calculated as the product of the correction coefficient Kr and the target reference generating force Fbxyti.

Since the target generating force Fxyti of each wheel is calculated to be precisely proportional to the vertical load of each wheel, that is, to be precisely proportional to the size of the frictional circle of each wheel, marginal limit relative to the force that each wheel may generate can be maximized. Thus, the force generation performance of each wheel can be maximized.

According to the second embodiment of the present invention, in Steps 410, 420, 450, 460, 490, two wheels for effectively achieving the target yaw moment Mt of the vehicle by the vector rotation of the wheel generating force are specified based on the sign of the product of the longitudinal acceleration Gx of the vehicle and the lateral acceleration Gy of the vehicle, that is, based on the direction of the target generating force Fxyt of the vehicle. In Steps 430, 470, 500, the resultant force Fm of the second target generating force for generating only the target yaw moment Mt regarding the specified wheels is calculated. Further, in Step 440, 480, 510, the target reference generating force Fbxyti is calculated based on the resultant force of the first target generating force Fxyt0i and the second target generating force of each wheel is calculated. In Step 550, the target generating force Fxyti of each wheel is calculated by correcting the strength of the target reference generating force Fbxyti by the correction coefficient Kr.

Compared to when the resultant force Fm of the second target generating force regarding one wheel or all wheels, irrespective of the direction of the target generating force Fxyt of the vehicle in which the directions of the target generating force Fxyti of all wheels are different from the direction of the target generating force Fxyt of the vehicle, according to the second embodiment, the direction of the target generating force Fxyti of two wheels other than the specified wheels is determined to be identical to the direction of the target generating force Fxyt of the vehicle. Thus, compared to when the resultant force Fm of the second target generating force is calculated regarding one wheel or all wheels, the force idly affecting the vehicle body of the vehicle as internal stress can be reduced.

According to the second embodiment of the present invention, since the transactions of Steps 50–250 and 600–800 are carried out likewise the first embodiment, the same operational effects as the first embodiment obtained from these transactions can be achieved.

Although the specific embodiments are presented, as forgoing, the present invention is not limited to the aforementioned embodiments.

For example, although, according to the foregoing embodiments, the vehicle 12 includes the engine 10 as the power source and the drivetrain for transmitting the driving torque of the power source to each wheel with a predetermined distribution ratio, and the braking and driving force controller includes the driving force controller (i.e., engine controller 26) for totally controlling the driving force of the all wheels by controlling the driving torque of the engine 10 and the braking force controller (i.e., the braking device 42 and the ECU 50) which is capable of independently controlling the braking force of each wheel, the driving force controller may independently control the driving force of each wheel and the braking force controller may be independently control the braking force of each wheel by structuring the vehicle as wheel-in-motor type vehicle.

Although, according to the first embodiment, each wheel is steered by variably controlling the effective length of the tie rods 58R, 58L, 68R, 68L of the hydraulic pressure type power steering device 56, 66 by the actuator 60R, 60L, 70R, 70L respectively, each wheel may be steered by the steering device independently provided for each wheel. Although, according to the second embodiment, both the sum of the second target generating force ΔFxytfr and ΔFxytfl of right, left front wheels and the sum of the second target generating force ΔFxytrr and ΔFxytrl of right, left rear wheels for achieving only the target yaw moment Mt of the vehicle correspond to ΔFxyt, ΔFxytf (i.e., the sum of the second target generating force ΔFxytfr, ΔFxytfl of right, left front wheels) and ΔFxytr (i.e., the sum of the second target generating force ΔFxytrl and ΔFxytrr of right, left rear wheels) may be calculated as different values from each other as long as ΔFxytf and ΔFxytr maintain a predetermined relationship.

For example, a ratio of the ΔFxytf which is the sum of the second target generating force of front wheels relative to the ΔFxytr which is the total of the second target generating force of rear wheels may be determined to correspond to a ratio of the distance Lr in longitudinal direction of the vehicle between the center of the gravity of the vehicle and the rear wheel axle relative to the distance Lf in the longitudinal direction of the vehicle between the center of the gravity of the vehicle and the front wheel axle (i.e., ΔFxytf:ΔFxytr=Lr:Lf).

In this case, Equations 84 and 85 apply as follows:

$$Mt = Iy \cdot \gamma td = \{(Fzfr \cdot Dfr + Fzfl \cdot Dfl)/(Fzfr + Fzfl)\} \cdot \Delta Fxytf + \{(Fzrr \cdot Drr + Fzrl \cdot Drl)/(Fzrr + Fzrl)\} \cdot \Delta Fxytr = \{(Fzfr \cdot Dfr + Fzfl \cdot Dfl)/(Fzfr + Fzfl)\} + \{(Fzrr \cdot Drr + Fzrl \cdot Drl)/(Fzrr + Fzrl)\} \cdot (L/Lr) \, \Delta Fxytf \quad (84)$$

$$Km = \{(Fzfr \cdot Dfr + Fzfl \cdot Dfl)/(Fzfr + Fzfl)\} + \{(Fzrr \cdot Drr + Fzrl \cdot Drl)/(Fzrr + Fzrl)\} \cdot (L/Lr) \quad (85)$$

Accordingly, the second target generating force ΔFxyti (i=fl, fr, rl, rr) of each wheel for achieving only the target yaw moment Mt of the vehicle is calculated according to Equations 86–89.

$$\Delta Fxytfl = \{Fzfl/(Fzfr + Fzfl)\} \cdot \Delta Fxytf = \{Fzfl/(Fzfr + Fzfl)\} \cdot Iy \cdot \gamma td/Km \quad (86)$$

$$\Delta Fxytfr = \{Fzfr/(Fzfr + Fzfl)\} \cdot \Delta Fxytr = \{Fzfr/(Fzfr + Fzfl)\} \cdot Iy \cdot \gamma td/Km \quad (87)$$

$$\Delta Fxytrl = -\{Fzrl/(Fzrr + Fzrl)\} \cdot \Delta Fxytr = -\{Fzrl/Fzrr + Fzrl)\} \cdot Iy \cdot \gamma td (L/Lr)/Km \quad (88)$$

$$\Delta Fxytrr = -\{Fzrr/(Fzrr + Fzrl)\} \cdot \Delta Fxytr = -\{Fzrr/(Fzrr + Fzrl)\} \cdot Iy \cdot \gamma td (L/Lr)/Km \quad (89)$$

According to the driving control device of the present invention, the target longitudinal force of the vehicle, the target lateral force of the vehicle, and the target yaw moment of the vehicle are calculated based on the steering operation amount, the driving force operation amount, and the braking force operation amount by the driver and the steering angle and the braking and driving torque of each wheel are controlled for achieving the vehicle target longitudinal force, the vehicle target lateral force, and the vehicle target yaw moment by the generating force of each wheel. Thus, compared to when only the braking and driving force of each wheel are controlled, the control range of the strength of the generating force, and the direction of each wheel, can be expanded to effectively apply the performance of the wheel (tire), and thus the vehicle motion can be precisely controlled in accordance with the driving operation of the driver to improve the vehicle drivability.

According to the driving control device of the present invention, by the feed forward controlling of the steering angle and the braking and driving force of each wheel so that the generating force of each wheel is determined to be corresponding target generating force, the longitudinal force, the lateral force, and the yaw moment of the vehicle are controlled to be the target longitudinal force, the target lateral force, and the target yaw moment of the vehicle. Thus, compared to when the general known driving control device in which the braking and driving force of each wheel are independently controlled by the feedback control so that the deviation between the vehicle target behavior index and the actual vehicle behavior index is reduced, the vehicle motion can be precisely and effectively controlled in accordance with the driving operation by the driver according to the driving control device of the present invention.

According to the driving control device of the present invention, the direction of the resultant force of the target generating force of each wheel match the direction of the resultant force of the vehicle target longitudinal force and the vehicle target lateral force and the strength and the direction of the vehicle target generating force of each wheel are determined for achieving the vehicle target longitudinal force, the vehicle target lateral force, and the vehicle target yaw moment by the resultant force of the target generating force of each wheel. Thus, the strength and the direction of the target generating force of each wheel are determined to effectively achieve the vehicle target longitudinal force, the vehicle target lateral force and the vehicle target yaw moment by the target generating force of each wheel. Accordingly, the part of the force generated by each wheel that idly affects the vehicle body as internal stress is prevented, thus to achieve the stable traveling performance of the vehicle by more effectively applying the generated force by each wheel.

According to the driving control device of the present invention, since the target generating force of each wheel is calculated as the sum of the first target generating force of each wheel (for achieving the vehicle target longitudinal force and the vehicle target lateral force) without giving the target yaw moment to the vehicle and the second target generating force of each wheel (for achieving only the target yaw moment), the target generating force of each wheel can be calculated in order to securely achieve the target longitudinal force, the target lateral force, and the target yaw moment of the vehicle.

According to the driving control device of the present invention, the second target generating force of each wheel for achieving the target yaw moment can be calculated without largely deviating from the relationship that the direction of the resultant force of the target generating force of each wheel match the direction of the resultant force of the target longitudinal force of the vehicle and the vehicle target lateral force, and without largely deviating from the relationship that the target generating force of each wheel is proportional to the vertical load of each wheel.

According to the driving control device of the present invention, the target generating force of each wheel for achieving the vehicle target longitudinal force, the target lateral force, and the target yaw moment can be precisely calculated without largely deviating from the relationship that the resultant force of the target generating force of each wheel match the direction of the resultant force of the vehicle target lateral force and the vehicle target longitudinal force and the target generating force of each wheel is completely proportional to the vertical load of each wheel.

According to the driving control device of the present invention, since one of the left or right wheels which has larger arm length of the yaw moment around the center of the gravity of the vehicle by the second target generating force is specified as a wheel which is appropriate for effectively generating the second target generating force, the strength of the second target generating force can be reduced compared to the case that the other wheel is specified. Thus, the correction amount for the vehicle target generating force of the specified wheel and for the target generating force of the wheel which is not specified can be small.

According to the driving control device of the present invention, the direction of the target generating force of the wheels which is not specified can precisely correspond to the direction of the resultant force of the vehicle target longitudinal force and the target lateral force. Thus, compared to when the directions of the target generating force of all wheels are different from the resultant force of the target longitudinal force and the target lateral force by specifying one wheel or all wheels, the target generating force of each wheel can be calculated easier and the force generated by the wheels to idly affect the vehicle as internal stress can be significantly reduced.

According to the driving control device of the present invention, the target braking and driving torque of each wheel, and the target steering angle of each wheel for achieving the target generating force of each wheel, can be precisely calculated and the target steering angle of each wheel can be precisely calculated without being diverged.

In the illustrated embodiments, the controllers are implemented with a general purpose processor. It will be appreciated by those skilled in the art that the controllers can be implemented using a single special purpose integrated circuit (e.g., ASIC) having a main or central processor section for overall, system-level control, and separate sections dedicated to performing various different specific computations, functions and other processes under control of the central processor section. The controllers can be a plurality of separate dedicated or programmable integrated or other electronic circuits or devices (e.g., hardwired electronic or logic circuits such as discrete element circuits, or programmable logic devices such as PLDs, PLAs, PALs or the like). The controllers can be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controllers. A distributed processing architecture can be used for maximum data/signal processing capability and speed. Thus, first, second and third controllers referred to herein could be separate processors or a single processor.

While the invention has been described with reference to what are preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A driving control device for a vehicle comprising:
   a first controller that controls a steering angle of each wheel;
   a second controller that controls a braking and driving force of each wheel;
   a first detector that detects a steering operation amount by a driver of the vehicle;
   a second detector that detects a driving operation amount by the driver;
   a third detector that detects a braking operation amount by the driver;
   a first calculator that calculates a vehicle target longitudinal force, a vehicle target lateral force, and a vehicle target yaw moment based on the detected steering operation amount, the detected driving force operation amount, and the detected braking force operation amount;
   a second calculator that calculates a target generating force of each wheel based on the target longitudinal force, the target lateral force, and the target yaw moment;
   a third calculator that calculates a target steering angle and target braking and driving torque based on the target generating force of each wheel; and
   a third controller that controls the first and second controllers so that a steering angle and the braking and driving torque of each wheel are determined to be the target steering angle and the target braking and driving torque respectively.

2. The driving control device according to claim 1, wherein the second calculator determines a direction and a strength of the vehicle target generating force of each wheel so that a direction of a resultant force of the target generating force of each wheel matches a direction of a resultant force of the vehicle target lateral force and the vehicle target longitudinal force, and so that the vehicle target longitudinal force, the vehicle target lateral force, and the vehicle target yaw moment are achieved by the resultant force of the target generating force of each wheel.

3. The driving control device according to claim 2, wherein the second calculator further comprises a fourth calculator that calculates a first target generating force of each wheel for achieving the vehicle target lateral force and a vehicle target longitudinal force without giving the target yaw moment to a vehicle, and a fifth calculator that calculates a second target generating force of each wheel for achieving only the target yaw moment and calculates the target generating force of each wheel as a total of the first target generating force and the second target generating force.

4. The driving control device according to claim 3, wherein the vehicle comprises right and left front wheels and right and left rear wheels, the second calculator further comprises a fourth controller that obtains a vertical load of each wheel, the fourth calculator calculates the first target generating force of each wheel by distributing the resultant force of the vehicle target longitudinal force and the vehicle target lateral force to each wheel proportional to the vertical load of each wheel, and the fifth calculator further comprises a fifth controller that calculates a yaw moment generating force of front wheels as a total of a force which is to be generated by the right and left front wheels for achieving only the target yaw moment based on a direction of the resultant force of the vehicle target lateral force and the vehicle target longitudinal force and the target yaw moment, and for calculating a yaw moment generating force of the rear wheels which has a predetermined relationship relative to the yaw moment generating force of the front wheels as a total of a force which is to be generated by the right and left rear wheels, and a sixth controller that calculates the second target generating force of each wheel by distributing the yaw moment generating force of the front wheel to the right and left front wheels being proportional to the vertical load of right and left front wheels, and by distributing the yaw moment generating force of the rear wheel to the right and left rear wheels proportional to the vertical load of right and left rear wheels.

5. The driving control device according to claim 4, wherein the yaw moment generating force of the front wheel and the yaw moment generating force of the rear wheel are the same value.

6. The driving control device according to claim 4, wherein a distance between a center of a gravity of the vehicle and a front wheel axle in a vehicle longitudinal direction is determined to be Lf, and a distance between the center of the gravity of the vehicle and a rear wheel axle in vehicle longitudinal direction is determined to be Lr, wherein a ratio of the yaw moment generating force of the front wheels relative to the yaw moment generating force of the rear wheels corresponds to Lr/Lf.

7. The driving control device according to claim 4, wherein the fourth controller that obtains the vertical load of each wheel calculates the vertical load of each wheel based on a mass of the vehicle, a vehicle longitudinal acceleration, and a vehicle lateral acceleration.

8. The driving control device according to claim 3, wherein the second calculator further comprises a sixth calculator that obtains the vertical load of each wheel, the second calculator calculates the first target generating force of each wheel by distributing the resultant force of the vehicle target longitudinal force and the vehicle target lateral force being proportional to the vertical load of each wheel, the third calculator specifies a wheel which is appropriate for effectively generating the second target generating force based on the vehicle target longitudinal force and the vehicle target lateral force, and a seventh calculator that calculates the second target generating force as a force which is vertical to the first target generating force regarding the specified wheel, the second calculator further determines the target generating force of the specified wheel to the resultant force of the first target generating force and the second target generating force, determines the target generating force of the wheel which is not specified to the corresponding first target generating force, and corrects the strength of the target generating force of the wheel which is not specified and the target generating force of the specified wheel so that the resultant force of the target generating force of the specified wheel and the target generating force of the wheel which is not specified achieves the vehicle target lateral force and the vehicle target longitudinal force.

9. The driving control device according to claim 8, wherein the third calculator specifies one of the right and left wheels which has a longer arm length of the yaw moment around the center of the gravity of the vehicle by the second target generating force as a wheel appropriate for effectively generating the second target generating force.

10. The driving control device according to claim 8, wherein the vehicle is a four-wheel vehicle having right and left-front wheels and right and left-rear wheels, and the third calculator specifies two wheels, front-left wheel and rear-right wheel or front-right wheel and rear-left wheel, based on a direction of the vehicle target longitudinal force and the vehicle target lateral force when the target longitudinal force of the vehicle and the vehicle target lateral force are not zero.

11. The driving control device according to claim 10, wherein the fifth calculator that calculates the second target generating force corrects the strength of the second target generating force to be the first target generating force of the wheel when the calculated second target generating force is greater than the first target generating force of the specified wheel.

12. The driving control device according to claim 8, wherein the vehicle is a four-wheel vehicle having right and left-front wheels and right and left-rear wheels, and the third calculator specifies all wheels when either one or both of the vehicle target longitudinal force and the vehicle target lateral force are zero.

13. The driving control device according to claim 12, wherein the fifth calculator that calculates the second target generating force corrects the strength of the second target generating force to be the strength of the first target generating force when the strength of the calculated second target generating force is greater than the first target generating force of the specified wheel.

14. The driving control device according to claim 1, wherein the third calculator comprises a seventh calculator that calculates a target traveling direction angle of a grounding point of each wheel relative to the vehicle longitudinal direction, an eighth calculator that calculates a target vertical load of each wheel, a ninth calculator that calculates a target wheel longitudinal force and a target wheel lateral force at a wheel coordinates of each wheel based on the target generating force and a previous target angle, a tenth calculator that calculates a target slip angle of each wheel as a total of the previous target steering angle and the target traveling direction angle at grounding point of each wheel, an eleventh calculator that calculates a target slip ratio and a lateral force predicted value of each wheel based on the target wheel longitudinal force of each wheel, the target slip angle of each wheel, and the target vertical load of each wheel, and a twelfth calculator that calculates a target steering angle and a target rotation torque of each wheel based on the target wheel longitudinal force of each wheel, the target wheel lateral force of each wheel, the lateral force predicted value of each wheel, and the target slip ratio of each wheel.

15. The driving control device according to claim 14, wherein the twelfth calculator that calculates the target steering angle and the target rotation torque of each wheel determines the target steering angle of each wheel to be the previous target steering angle when a deviation between the target wheel lateral force and the lateral force predicted value is less than a predetermined value, and calculates a target steering angle correction amount based on the deviation between the target wheel lateral force and the lateral force predicted value, and determines the target steering angle of each wheel to be a value that the previous target steering value is corrected with the target steering angle correction amount when the deviation between the target wheel lateral force and the lateral force predicted value is greater than the predetermined value.

16. The driving control device according to claim 15, wherein the twelfth calculator that calculates the target steering angle and the target rotation torque of each wheel calculates a target steering angle correction amount as a value proportional to the deviation between the target wheel lateral force and the lateral force predicted value.

17. The driving control device according to claim 14, wherein the vehicle comprises a power source and a drivetrain for transmitting a driving torque of the power source to each wheel with a predetermined distribution ratio, the second controller comprises a seventh controller that controls the driving force of all wheels by controlling the driving torque of the power source, and an eighth controller which is capable of independently controlling the braking force of each wheel, and the third calculator calculates the target driving torque of the power source based on a maximum value on driving side in the target rotation torque of each wheel and calculates the target braking force control amount based on the target rotation torque of other wheels and the maximum value regarding the other wheels other than the wheel having the maximum target rotation torque.

18. The driving control device according to claim 14, wherein the twelfth calculator that calculates the target steering angle and the target rotation torque of the wheel calculates a correction amount of the target steering angle of each wheel based on the target wheel lateral force and the lateral force predicted value of each wheel, and calculates the target steering angle of each wheel as a total of the previous target steering angle and the correction amount of the target steering angle.

19. The driving control device according to claim 14, wherein the twelfth calculator that calculates the target steering angle and the target rotation torque of each wheel calculates the target wheel acceleration of each wheel based on the target slip ratio of each wheel, and calculates a target rotation torque of each wheel as a total of a second target rotation torque based on the target wheel acceleration of each wheel and a first rotation torque based on the target wheel longitudinal force of each wheel.

20. The driving control device according to claim 1, wherein the first calculator calculates a vehicle target longitudinal acceleration, a vehicle target lateral acceleration, and a vehicle target yaw rate based on the steering operation amount, the driving force operation amount, and the braking force operation amount by the driver and calculates the vehicle target longitudinal force, the vehicle target lateral force, and the vehicle target yaw moment based on the vehicle target longitudinal acceleration, the vehicle target lateral acceleration, and the vehicle target yaw rate respectively.

21. The driving control device according to claim 1, wherein the second controller comprises a seventh controller and an eighth controller.

22. The driving control device according to claim 21, wherein the seventh controller controls the driving force of all wheels, and the eighth controller is capable of independently controlling the braking force of each wheel.

23. The driving control device according to claim 21, wherein the seventh controller is capable of independently controlling the driving force of each wheel, and the eighth controller is capable of independently controlling the braking force of each wheel.

24. The driving control device according to claim 1, wherein the vehicle corresponds to a four-wheel vehicle having right and left-front wheels and right and left-rear wheels.

25. A driving control method for a vehicle comprising:
    detecting a steering operation amount by a driver of the vehicle;
    detecting a driving operation amount by the driver;
    detecting a braking operation amount by the driver, calculating a vehicle target longitudinal force, a vehicle target lateral force, and a vehicle target yaw moment based on the detected steering operation amount, the detected driving force operation amount, and the detected braking force operation amount;
    calculating a target generating force of each wheel based on the target longitudinal force, the target lateral force, and the target yaw moment;
    calculating a target steering angle and target braking and driving torque based on the target generating force of each wheel; and
    controlling a steering angle and the braking and driving torque of each wheel of the vehicle to be the target steering angle and the target braking and driving torque respectively.

26. The driving control method according to claim 25, further comprising:
    determining a direction and a strength of the vehicle target generating force of each wheel so that a direction of a resultant force of the target generating force of each wheel matches a direction of a resultant force of the vehicle target lateral force and the vehicle target longitudinal force, and so that the vehicle target longitudinal force, the vehicle target lateral force, and the vehicle target yaw moment are achieved by the resultant force of the target generating force of each wheel.

27. The driving control method according to claim 26, further comprising:
    calculating a first target generating force of each wheel for achieving the vehicle target lateral force and a vehicle target longitudinal force without giving the target yaw moment to a vehicle;
    calculating a second target generating force of each wheel for achieving only the target yaw moment; and
    calculating the target generating force of each wheel as a total of the first target generating force and the second target generating force.

28. The driving control method according to claim 27, wherein the vehicle comprises right and left front wheels and right and left rear wheels, further comprising:

obtaining a vertical load of each wheel;

calculating the first target generating force of each wheel by distributing the resultant force of the vehicle target longitudinal force and the vehicle target lateral force to each wheel proportional to the vertical load of each wheel;

calculating a yaw moment generating force of front wheels as a total of a force which is to be generated by the right and left front wheels for achieving only the target yaw moment based on a direction of the resultant force of the vehicle target lateral force and the vehicle target longitudinal force and the target yaw moment;

calculating a yaw moment generating force of the rear wheels which has a predetermined relationship relative to the yaw moment generating force of the front wheels as a total of a force which is to be generated by the right and left rear wheels;

calculating the second target generating force of each wheel by distributing the yaw moment generating force of the front wheel to the right and left front wheels being proportional to the vertical load of right and left front wheels; and distributing the yaw moment generating force of the rear wheel to the right, left rear wheels proportional to the vertical load of right and left rear wheels.

29. The driving control method according to claim 28, wherein the yaw moment generating force of the front wheel and the yaw moment generating force of the rear wheel are the same value.

30. The driving control method according to claim 28, wherein a distance between a center of a gravity of the vehicle and a front wheel axle in a vehicle longitudinal direction is determined to be Lf, a distance between the center of the gravity of the vehicle and a rear wheel axle in vehicle longitudinal direction is determined to be Lr, and a ratio of the yaw moment generating force of the front wheels relative to the yaw moment generating force of the rear wheels corresponds to Lr/Lf.

31. The driving control device according to claim 28, further comprising obtaining the vertical load of each wheel by calculating the vertical load of each wheel based on a mass of the vehicle, a vehicle longitudinal acceleration, and a vehicle lateral acceleration.

32. The driving control method according to claim 27, further comprising:

obtaining the vertical load of each wheel;

calculating the first target generating force of each wheel by distributing the resultant force of the vehicle target longitudinal force and the vehicle target lateral force being proportional to the vertical load of each wheel;

specifying a wheel which is appropriate for effectively generating the second target generating force based on the vehicle target longitudinal force and the vehicle target lateral force;

calculating the second target generating force as a force which is vertical to the first target generating force regarding the specified wheel;

determining the target generating force of the specified wheel to the resultant force of the first target generating force and the second target generating force;

determining the target generating force of the wheel which is not specified to the corresponding first target generating force; and correcting the strength of the target generating force of the wheel which is not specified and the target generating force of the specified wheel so that the resultant force of the target generating force of the specified wheel and the target generating force of the wheel which is not specified achieves the vehicle target lateral force and the vehicle target longitudinal force.

33. The driving control method according to claim 32, further comprising specifying one of the right and left wheels which has a longer arm length of the yaw moment around the center of the gravity of the vehicle by the second target generating force as a wheel appropriate for effectively generating the second target generating force.

34. The driving control method according to claim 32, wherein the vehicle corresponds to a four-wheel vehicle having right and left-front wheels and right and left-rear wheels, further comprising specifying two wheels, front-left wheel and rear-right wheel or front-right wheel and rear-left wheel, based on a direction of the vehicle target longitudinal force and the vehicle target lateral force when the target longitudinal force of the vehicle and the vehicle target lateral force are not zero.

35. The driving control method according to claim 34, further comprising correcting the strength of the second target generating force to be the first target generating force of the wheel when the calculated second target generating force is greater than the first target generating force of the specified wheel.

36. The driving control method according to claim 32, wherein the vehicle corresponds to a four-wheel vehicle having right and left-front wheels and right and left-rear wheels, further comprising specifying all wheels when either one or both of the vehicle target longitudinal force and the vehicle target lateral force are zero.

37. The driving control method according to claim 36, further comprising correcting the strength of the second target generating force to be the strength of the first target generating force when the strength of the calculated second target generating force is greater than the first target generating force of the specified wheel.

38. The driving control method according to claim 25, further comprising:

calculating a target traveling direction angle of a grounding point of each wheel relative to the vehicle longitudinal direction;

calculating a target vertical load of each wheel;

calculating a target wheel longitudinal force and a target wheel lateral force at a wheel coordinates of each wheel based on the target generating force and a previous target angle;

calculating a target slip angle of each wheel as a total of the previous target steering angle and the target traveling direction angle at grounding point of each wheel;

calculating a target slip ratio and a lateral force predicted value of each wheel based on the target wheel longitudinal force of each wheel, the target slip angle of each wheel, and the target vertical load of each wheel; and calculating a target steering angle and a target rotation torque of each wheel based on the target wheel longitudinal force of each wheel, the target wheel lateral force of each wheel, the lateral force predicted value of each wheel, and the target slip ratio of each wheel.

39. The driving control method according to claim 38, further comprising:

determining the target steering angle of each wheel to be the previous target steering angle when a deviation between the target wheel lateral force and the lateral force predicted value is less than a predetermined value;

calculating a target steering angle correction amount based on the deviation between the target wheel lateral force and the lateral force predicted value; and determining the target steering angle of each wheel to be a value that the previous target steering value is corrected with the target steering angle correction amount when the deviation between the target wheel lateral force and the lateral force predicted value is greater than the predetermined value.

40. The driving control method according to claim 39, further comprising calculating a target steering angle correction amount as a value proportional to the deviation between the target wheel lateral force and the lateral force predicted value.

41. The driving control method according to claim 38, further comprising:

transmitting a driving torque of the power source to each wheel with a predetermined distribution ratio;

controlling the driving force of all wheels by controlling the driving torque of the power source;

controlling independently the braking force of each wheel;

calculating the target driving torque of the power source based on a maximum value on driving side in the target rotation torque of each wheel; and calculating the target braking force control amount based on the target rotation torque of other wheels and the maximum value regarding the other wheels other than the wheel having the maximum target rotation torque.

42. The driving control method according to claim 38, further comprising calculating a correction amount of the target steering angle of each wheel based on the target wheel lateral force and the lateral force predicted value of each wheel, and calculating the target steering angle of each wheel as a total of the previous target steering angle and the correction amount of the target steering angle.

43. The driving control method according to claim 38, further comprising calculating the target wheel acceleration of each wheel based on the target slip ratio of each wheel, and calculating a target rotation torque of each wheel as a total of a second target rotation torque based on the target wheel acceleration of each wheel and a first rotation torque based on the target wheel longitudinal force of each wheel.

44. The driving control method according to claim 25, further comprising calculating a vehicle target longitudinal acceleration, a vehicle target lateral acceleration, and a vehicle target yaw rate based on the steering operation amount, the driving force operation amount, and the braking force operation amount by the driver and calculating the vehicle target longitudinal force, the vehicle target lateral force, and the vehicle target yaw moment based on the vehicle target longitudinal acceleration, the vehicle target lateral acceleration, and the vehicle target yaw rate respectively.

45. The driving control method according to claim 25, further comprising controlling the driving force of all wheels, and controlling independently the braking force of each wheel.

46. The driving control method according to claim 45, further comprising controlling independently the driving force of each wheel, and the braking force of each wheel.

47. The driving control method according to claim 25, wherein the vehicle corresponds to a four-wheel vehicle having right and left-front wheels and right and left-rear wheels.

* * * * *